US011881152B2

(12) United States Patent
Pyun et al.

(10) Patent No.: US 11,881,152 B2
(45) Date of Patent: Jan. 23, 2024

(54) DISPLAY DEVICE WITH SELF-ADJUSTING POWER SUPPLY

(71) Applicant: SAMSUNG DISPLAY CO., LTD., Yongin-si (KR)

(72) Inventors: Ki Hyun Pyun, Yongin-si (KR); Jang Mi Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/645,153

(22) Filed: Dec. 20, 2021

(65) Prior Publication Data

US 2022/0254300 A1 Aug. 11, 2022

(30) Foreign Application Priority Data

Feb. 9, 2021 (KR) ........................ 10-2021-0018620

(51) Int. Cl.
*G09G 3/32* (2016.01)
*G09G 3/3233* (2016.01)

(52) U.S. Cl.
CPC ............. *G09G 3/32* (2013.01); *G09G 3/3233* (2013.01); *G09G 2310/0275* (2013.01); *G09G 2310/0278* (2013.01); *G09G 2310/08* (2013.01); *G09G 2330/021* (2013.01); *G09G 2330/025* (2013.01); *G09G 2330/04* (2013.01)

(58) Field of Classification Search
CPC ................... G09G 3/32; G09G 3/3233; G09G 2310/0275; G09G 2310/0278; G09G 2310/08; G09G 2330/021; G09G 2330/025; G09G 2330/04
See application file for complete search history.

(56) References Cited

U.S. PATENT DOCUMENTS

| | | | | |
|---|---|---|---|---|
| 7,233,302 | B2 * | 6/2007 | Ishizuka | G09G 3/3233 345/82 |
| 8,054,258 | B2 | 11/2011 | Choi et al. | |
| 8,558,767 | B2 | 10/2013 | Kwon | |
| 9,041,626 | B2 | 5/2015 | Park et al. | |

(Continued)

FOREIGN PATENT DOCUMENTS

| | | |
|---|---|---|
| KR | 10-0639005 | 10/2006 |
| KR | 10-0844770 | 7/2008 |

(Continued)

*Primary Examiner* — Michael J Jansen, II
(74) *Attorney, Agent, or Firm* — F. CHAU & ASSOCIATES, LLC

(57) ABSTRACT

A display device includes a power supply generating a first power voltage, a second power voltage, and a third power voltage. The display device further includes a first power line to which the first power voltage is applied, a second power line to which the second power voltage is applied, and a readout line to which the third power voltage is applied. The display device further includes a display panel, which includes a pixel. The pixel includes a light emitting element connected between the first power line and the second power line, and a switching transistor connected between one electrode of the light emitting element and the readout line. The power supply changes a voltage level of the third power voltage based on a total current flowing from the power supply to the display panel according to the first and second power voltages.

22 Claims, 11 Drawing Sheets

(56) References Cited

U.S. PATENT DOCUMENTS

| | | | | |
|---|---|---|---|---|
| 9,685,111 | B2 * | 6/2017 | Choi | G09G 3/3233 |
| 9,881,558 | B2 * | 1/2018 | Lee | G09G 3/20 |
| 10,825,388 | B2 * | 11/2020 | Tomitani | G09G 3/3233 |
| 10,916,198 | B2 * | 2/2021 | Lin | G09G 3/3233 |
| 10,984,712 | B2 * | 4/2021 | Brownlow | G09G 3/3275 |
| 11,081,054 | B2 * | 8/2021 | Kim | G09G 3/3291 |
| 2003/0128201 | A1 * | 7/2003 | Ishizuka | G09G 3/3291 345/212 |
| 2014/0333603 | A1 * | 11/2014 | Choi | G09G 3/3233 345/82 |
| 2015/0310808 | A1 * | 10/2015 | Lee | G09G 3/2007 345/77 |
| 2019/0164485 | A1 * | 5/2019 | Tomitani | G09G 3/3233 |
| 2020/0152128 | A1 * | 5/2020 | Kim | G09G 3/3233 |
| 2020/0184888 | A1 * | 6/2020 | Brownlow | G09G 3/3266 |
| 2020/0226978 | A1 * | 7/2020 | Lin | G09G 3/3258 |

FOREIGN PATENT DOCUMENTS

| | | |
|---|---|---|
| KR | 10-0893482 | 4/2009 |
| KR | 10-0894606 | 4/2009 |

* cited by examiner

DISPLAY DEVICE WITH SELF-ADJUSTING POWER SUPPLY

CROSS-REFERENCE TO RELATED APPLICATIONS

This patent application claims priority under 35 U.S.C. § 119 to Korean Patent Application No. 10-2021-0018620, filed on Feb. 9, 2021, the disclosure of which is incorporated by reference herein in its entirety.

TECHNICAL FIELD

Embodiments of the inventive concept relate to a display device.

DISCUSSION OF RELATED ART

A display device may display content and may be included in a variety of electronic devices, such as personal computers, smartphones, tablets, mobile devices, televisions, and the like. An example of a display device is a flat-panel display, which may be lighter and thinner than a traditional cathode ray tube display device. Examples of flat-panel displays include liquid crystal display (LCD) devices, light-emitting diode (LED) devices, plasma panel devices, electroluminescent panel devices, organic light-emitting diode (OLED) devices, and quantum dot light emitting diode devices.

A display device may include a data driver, a gate driver, and a display panel, and the display panel may include pixels. The data driver may provide data signals to the pixels through data lines. The data driver may generate the data signals based on input image data and provide the data signals to the pixels. The gate driver may provide scan signals to the pixels. Each of the pixels may write a corresponding data signal in response to a scan signal and may emit light with a luminance corresponding to the amount of current flowing through the pixel based on the data signal.

SUMMARY

An embodiment of the inventive concept provides a display device capable of reducing power consumption by mitigating occurrence of overcurrent.

According to an embodiment of the inventive concept, a display device includes a power supply generating a first power voltage, a second power voltage, and a third power voltage. The display device further includes a first power line to which the first power voltage is applied, a second power line to which the second power voltage is applied, and a readout line to which the third power voltage is applied. The display device further includes a display panel, which includes a pixel. The pixel includes a light emitting element connected between the first power line and the second power line, and a switching transistor connected between one electrode of the light emitting element and the readout line. The power supply changes a voltage level of the third power voltage based on a total current flowing from the power supply to the display panel according to the first and second power voltages.

In an embodiment, the power supply changes the voltage level of the third power voltage in response to a value of the total current being greater than a first reference current value.

In an embodiment, the power supply changes the voltage level of the third power voltage from a first voltage level to a second voltage level when the value of the total current is greater than the first reference current value.

In an embodiment, the power supply gradually changes the voltage level of the third power voltage as the value of the total current increases.

In an embodiment, the power supply maintains the voltage level of the third power voltage at the second voltage level when the value of the total current is less than a predetermined second reference current, and changes the voltage level of the third power voltage to a third voltage level when the value of the total current is greater than the second reference current. A value of the second reference current is greater than the first reference current value.

In an embodiment, the power supply linearly changes the voltage level of the third power voltage based on a difference between the total current and the first reference current value.

In an embodiment, the display device further includes a power controller generating a power control signal for the voltage level of the third power voltage by comparing the total current with at least one reference current value, and the power supply changes the voltage level of the third power voltage based on the power control signal.

In an embodiment, the power supply includes a first power voltage generating circuit outputting the first power voltage; and a third power voltage generating circuit generating the third power voltage based on the power control signal. The power controller includes a current sensing circuit generating a current state signal by comparing the total current with the at least one reference current value, and a voltage determination circuit generating the power control signal based on the current state signal and a predetermined look-up table.

In an embodiment, the at least one reference current value includes a first reference current value, a second reference current value, and a and third reference current value. The current sensing circuit outputs the current state signal having a first value when the total current is within a first section smaller than the first reference current value, outputs the current state signal having a second value when the total current is within a second section between the first reference current value and the second reference current value, outputs the current state signal having a third value when the total current is within a third section between the second reference current value and the third reference current value, and outputs the current state signal having a fourth value when the total current is within a fourth section exceeding the third reference current value.

In an embodiment, the current state signal includes a first state signal, a second state signal, and a third state signal, each having a first logic level and a second logic level. The first state signal changes from the first logic level to the second logic level when the total current becomes greater than the first reference current value, the second state signal changes from the first logic level to the second logic level when the total current becomes greater than the second reference current value, and the third state signal changes from the first logic level to the second logic level when the total current becomes greater than the third reference current value.

In an embodiment, the display device further includes a timing controller calculating a load of input image data and generating image data by scaling a first data value in the input image data to a second data value based on the load; and a data driver generating a data signal based on the second data value of the image data and providing the third power voltage provided from the power supply to the readout line. The pixel further includes a driving transistor controlling an amount of driving current flowing through the light emitting element based on a voltage difference between the data signal and the third power voltage.

In an embodiment, the timing controller determines a value of a scaling factor so that a value obtained by multiplying the load and the scaling factor does not exceed a reference load value, and downscales the input image data based on the scaling factor.

In an embodiment, the timing controller calculates the load based on data values included in first frame data of the input image data in a first frame section, and generates second frame data of the image data by scaling second frame data of the input image data in a second frame section after the first frame section. The data driver generates the data signal based on first frame data of the image data in the first frame section, and generates the data signal based on the second frame data of the image data in the second frame section.

In an embodiment, when a load of the first frame data of the input image data becomes greater than a load of previous frame data, the total current becomes greater than the first reference current value in the first frame section, and the power supply changes the voltage level of the third power voltage from the first voltage level to the second voltage level in a partial section of the first frame section.

In an embodiment, when the value of the total current becomes greater than a second reference current value in the first frame section, the power supply changes the voltage level of the third power voltage to a third voltage level.

In an embodiment, when the total current becomes smaller than the first reference current value in the second frame section, the power supply changes the voltage level of the third power voltage from the second voltage level to the first voltage level in a partial section of the second frame section.

In an embodiment, a maximum luminance of the display panel in the second frame section is lower than a maximum luminance of the display panel in the first frame section.

In an embodiment, the display device further includes a scan driver sequentially providing a first scan signal and a second scan signal to the display panel. The display panel further includes a first pixel emitting light with a luminance corresponding to a voltage difference between a first data signal and the third power voltage in response to the first scan signal; and a second pixel emitting light with a luminance corresponding to a voltage difference between a second data signal and the third power voltage in response to the second scan signal. When the value of the total current becomes greater than the first reference current value in the first frame section, the first pixel and the second pixel emit light with different luminances in response to the first and second data signals having a same value.

In an embodiment, the luminance of the second pixel is lower than the luminance of the first pixel in the first frame section.

In an embodiment, when the value of the total current becomes smaller than the first reference current value in the second frame section, the first pixel and the second pixel emit light with different luminances in response to the same data value, but the luminance of the first pixel is lower than the luminance of the second pixel in the second frame section.

According to an embodiment of the inventive concept, a display device includes a power supply generating an initializing voltage and a supply voltage, and a display panel including a pixel. The power supply provides the initializing voltage and the supply voltage to the display panel, the initializing voltage initializes the pixel, and the power supply changes a voltage level of the initializing voltage based on a total current flowing from the power supply to the display panel according to the supply voltage.

In an embodiment, the power supply changes the voltage level of the initializing voltage in response to a value of the total current being greater than a first reference current value.

In an embodiment, the power supply linearly changes the voltage level of the initializing voltage based on a difference between the total current and the first reference current value.

BRIEF DESCRIPTION OF THE DRAWINGS

The above and other features of the inventive concept will become more apparent by describing in detail embodiments thereof with reference to the accompanying drawings, in which.

DETAILED DESCRIPTION

Figure 1A:
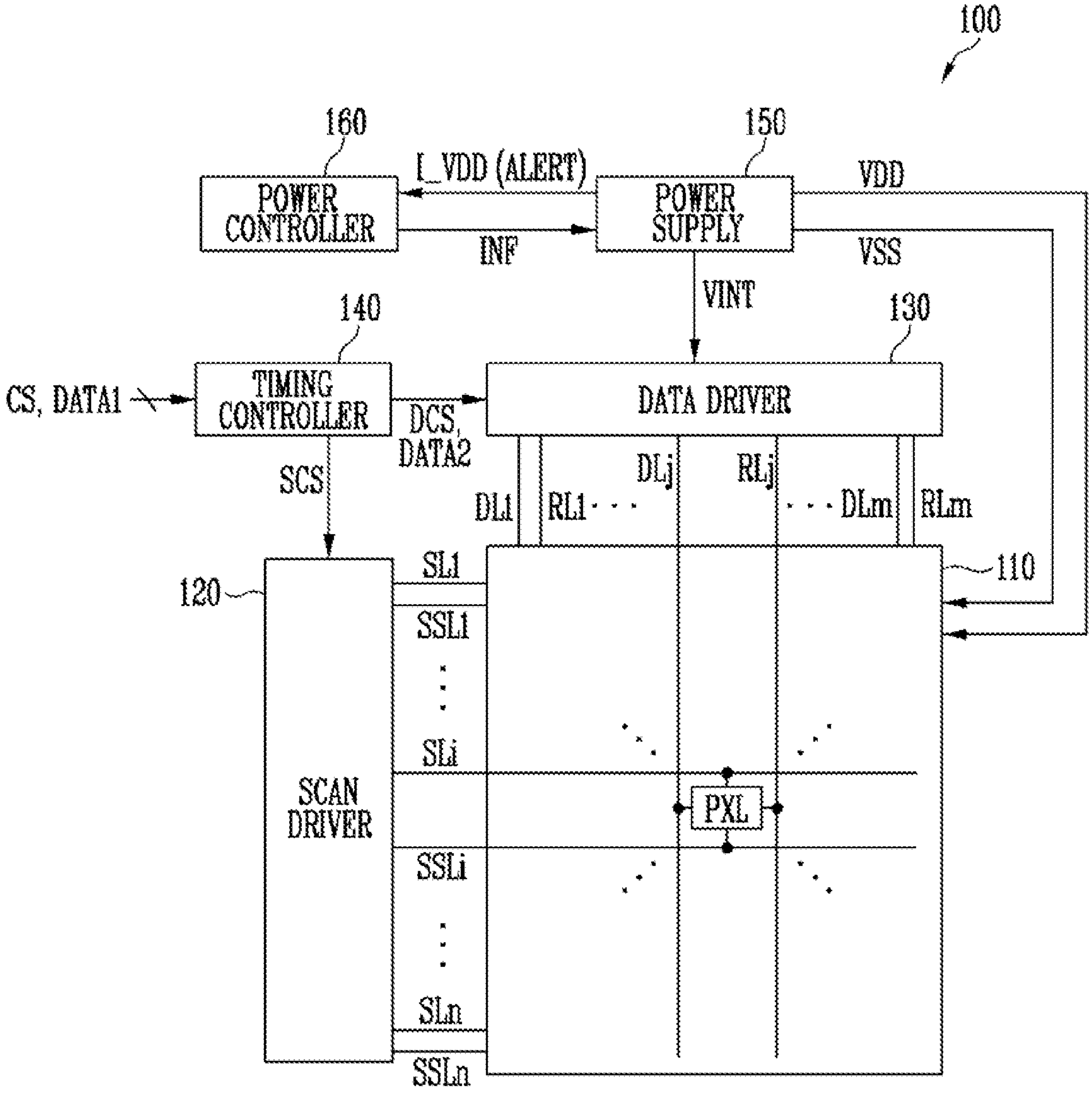
FIGS. 1A and 1B are diagrams of a display device according to embodiments of the inventive concept.

Embodiments of the inventive concept will be described more fully hereinafter with reference to the accompanying drawings. Like reference numerals may refer to like elements throughout the accompanying drawings, and duplicate descriptions of elements may be omitted. In the drawings, some elements which are not directly related to the features of embodiments of the inventive concept may be omitted It will be understood that although the terms "first", "second", etc. may be used herein to describe various elements, these elements should not be limited by these terms. These terms are only used to distinguish one element from another element. Thus, a first element discussed below could be termed a second element without departing from the teachings of the inventive concept. As used herein, the singular forms "a", "an", and "the" are intended to include the plural forms as well, unless the context clearly indicates otherwise.

As is traditional in the field of the inventive concept, embodiments are described and illustrated in the drawings in terms of functional blocks, units, and/or modules. Those skilled in the art will appreciate that these blocks, units, and/or modules may be physically implemented by electronic (or optical) circuits such as logic circuits, discrete components, microprocessors, hard-wired circuits, memory elements, wiring connections, etc.

Figure 1B:
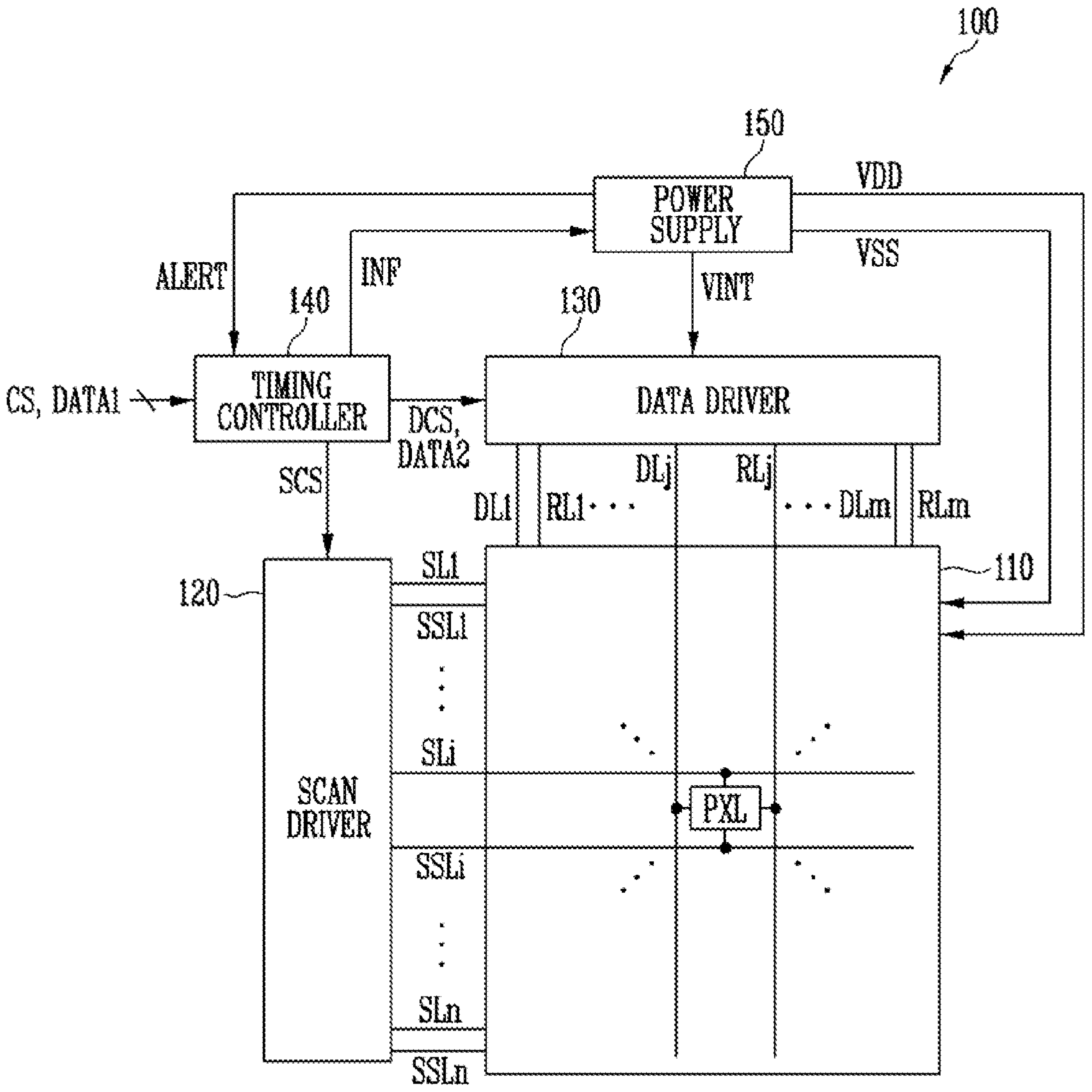

FIGS. 1A and 1B are diagrams of a display device according to embodiments of the inventive concept.

Referring to FIG. 1A, a display device 100 may include a display unit 110 (or a display panel), a scan driver 120 (or a gate driver), a data driver 130 (or a source driver), a timing controller 140, a power supply 150, and a power controller 160. The scan driver 120 (or the gate driver), the data driver 130 (or the source driver), the timing controller 140, the power supply 150, and the power controller 160 may constitute a driving device for driving the display unit 110. As used herein, any "driver" or "controller" may be implemented by circuits.

The display unit 110 may display an image. The display unit 110 may include scan lines SL1 to SLn, sensing scan lines SSL1 to SSLn, data lines DL1 to DLm, readout lines RL1 to RLm (or sensing lines), and pixels PXL, where n and m are positive integers.

The pixels PXL may be disposed or positioned in areas (for example, a pixel area) partitioned by the scan lines SL1 to SLn and the data lines DL1 to DLm.

Each pixel PXL may be connected to one of the scan lines SL1 to SLn and one of the data lines DL1 to DLm. Also, each pixel PXL may be connected to one of the sensing scan lines SSL1 to SSLn and one of the readout lines RL1 to RLm.

For example, a pixel PXL positioned in an i-th row and a j-th column may be connected to an i-th scan line SLi, an i-th sensing scan line SSLi, a j-th data line DLj, and a j-th readout line RLj, where i and j may be positive integers. Also, the pixel PXL may be electrically connected between a first power line to which a first power voltage VDD may be applied and a second power line to which a second power voltage VSS may be applied, and the first and second power voltages VDD and VSS may be power voltages or driving voltages required for an operation of the pixel PXL. The first power voltage VDD may have a voltage level higher than that of the second power voltage VSS. The first and second power voltages VDD and VSS may be provided from the power supply 150 to the display unit 110.

The pixel PXL may be initialized by a third power voltage VINT provided through the j-th readout line RLj in response to a sensing scan signal provided through the i-th sensing scan line SSLi. Also, the pixel PXL may store or write a data signal (or a data voltage) provided through the j-th data line DLj in response to a scan signal provided through the i-th scan line SLi, and may emit light with a luminance corresponding to the stored data signal. An initial voltage level of the third power voltage VINT may be set lower than an operating point (or a threshold voltage) of a light emitting element of the pixel PXL, and may be provided from the power supply 150 to the display unit 110 through the data driver 130. A detailed configuration of the pixel PXL will be described later with reference to FIG. 2.

The scan driver 120 may generate the scan signal (or scan signals) based on a scan control signal SCS and sequentially provide the scan signal to the scan lines SL1 to SLn. The scan control signal SCS may include a start signal, clock signals, and the like, and may be provided from the timing controller 140 to the scan driver 120. For example, the scan driver 120 may be implemented as a shift register that may sequentially generate and output a scan signal having a pulse shape by sequentially shifting a start signal having a pulse shape using the clock signals. The scan driver 120 may also generate the sensing scan signal and sequentially provide the sensing scan signal to the sensing scan lines SSL1 to SSLn in a similar manner.

The scan driver 120 may be formed on the display unit 110 together with the pixel PXL. However, embodiments of the inventive concept are not limited thereto. For example, the scan driver 120 may be mounted on a circuit film and connected to the timing controller 140 via at least one circuit film and a printed circuit board.

The data driver 130 may generate data signals (or data voltages) based on image data DATA2 and a data control signal DCS provided from the timing controller 140, and may provide the data signals to the display unit 110 (or the pixel PXL) through the data lines DL1 to DLm. The data control signal DCS may be a signal that controls an operation of the data driver 130 and may include a load signal indicating an output of a valid data signal (or a data enable signal), a horizontal start signal, a data clock signal, and the like. For example, the data driver 130 may include a shift register which may generate a sampling signal by shifting the horizontal start signal in synchronization with the data clock signal, a latch which may latch the image data DATA2 in response to the sampling signal, a digital-to-analog converter (or a decoder) which may convert the latched image data (for example, digital data) into analog data signals, and buffers (or amplifiers) which may output the data signals to the data lines DL1 to DLm. In addition, the data driver 130 may provide the third power voltage VINT (that is, the third power voltage VINT provided from the power supply 150) to the display unit 110 (or the pixel PXL) through the readout lines RL1 to RLm.

In an embodiment, in a predetermined sensing section (for example, a sensing section allocated to sense characteristic information of the pixel PXL such as a threshold voltage and/or mobility of a driving transistor included in the pixel PXL), the data driver 130 may receive a sensing signal from the pixel PXL through the readout lines RL1 to RLm. The data driver 130 or the timing controller 140 may compensate for a characteristic (or deviation in characteristic) of the pixel PXL based on the sensing signal.

The data driver 130 may be mounted on a circuit film and connected to the timing controller 140 via at least one printed circuit board and/or cable.

The timing controller 140 may receive input image data DATA1 and a control signal CS from outside (for example, from a graphic processor), generate the scan control signal SCS and the data control signal DCS based on the control signal CS, and generate the image data DATA2 by converting the input image data DATA1. The control signal CS may include a vertical synchronization signal (or Vsync), a horizontal synchronization signal (or Hsync), a reference clock signal, and the like. The vertical synchronization signal may indicate the start of frame data (that is, data corresponding to a frame section in which one frame image is displayed), and the horizontal synchronization signal may indicate the start of a data row (that is, one of a plurality of data rows included in the frame data). For example, the timing controller 140 may convert the input image data DATA1 in RGB format into the image data DATA2 in RGBG format corresponding to the pixel arrangement of the display unit 110.

In some embodiments, the timing controller 140 may calculate a load of the input image data DATA1 and may generate the image data DATA2 by scaling a first data value (for example, a grayscale value, a data bit) in the input image data DATA1 to a second data value based on the load. For example, the timing controller 140 may determine a scaling factor (or a value of the scaling factor) so that a value obtained by multiplying the load and the scaling factor does not exceed a reference load value and may downscale the input image data DATA1 based on the scaling factor. In this case, the size of the data signal supplied from the data driver 130 to the pixel PXL may be reduced, and the amount of current flowing through the pixel PXL (and the display unit 110) may be decreased, so that power consumption of the display device 100 can be reduced. That is, the timing controller 140 may reduce the power consumption through current limiting. A current limiting function of the timing controller 140 will be described later with reference to FIG. 3.

Meanwhile, the timing controller 140 may perform a scaling operation on the input image data DATA1 before, after, or concurrently with converting the format of the input image data DATA1.

The power supply 150 may supply the first power voltage VDD and the second power voltage VSS to the display unit 110. The power supply 150 may also provide the third power voltage VINT to the data driver 130. In addition, the power supply 150 may provide at least one power voltage, required for driving, to at least one of the scan driver 120, the data driver 130, and the timing controller 140. The power supply 150 may be implemented with a power management integrated circuit (PMIC).

In some embodiments, the power supply 150 may change a voltage level of the third power voltage VINT based on a total current I_VDD applied or flowing to the display unit 110 according to the supply of the first power voltage VDD and the second power voltage VSS. For example, the total current I_VDD may be measured through a current sensor at an output terminal of the power supply 150 from which the first power voltage VDD is output. When the total current I_VDD is greater than a first reference current value, the power supply 150 may change the voltage level of the third power voltage VINT in response to a voltage control signal INF (or a power voltage control signal) provided from the power controller 160.

The power controller 160 may generate the voltage control signal INF based on the total current I_VDD (or a current state signal ALERT indicating whether overcurrent occurs) provided from the power supply 150 (or the current sensor). For example, the power controller 160 may generate the voltage control signal INF for the voltage level of the third power voltage VINT by comparing the total current I_VDD with at least one reference current value (for example, the first reference current value). For example, when the total current I_VDD becomes greater than the first reference current value, the power controller 160 may control the power supply 150 so that the voltage level of the third power voltage VINT may change from a first voltage level to a second voltage level. The second voltage level may be higher than the first voltage level, but the inventive concept is not limited thereto. In a state where the total current I_VDD is greater than the first reference current value, when the total current I_VDD becomes smaller than the first reference current, the power controller 160 may control the power supply 150 so that the voltage level of the third power voltage VINT may change from the second voltage level to the first voltage level again. According to an embodiment, as the total current I_VDD becomes larger than the first reference current value, the power controller 160 may control the power supply 150 so that the voltage level of the third power voltage VINT may change gradually or linearly.

As will be described later, when the third power voltage VINT is changed, a gate-source voltage (that is, a voltage applied between a gate electrode and a source electrode) of the driving transistor in the pixel PXL may be changed in response to the third power voltage VINT, and the current flowing through the light emitting element in the pixel PXL may be changed. In response to this, the current flowing through the entire display unit 110 (that is, the total current I_VDD) may be changed. To mitigate excessive increase in the total current I_VDD applied to the display unit 110 (that is, to mitigate occurrence of overcurrent), when the total current I_VDD increases, the power controller 160 may change the voltage level of the third power voltage VINT by reducing the gate-source voltage.

At least a part of the power controller 160 may be implemented as an integrated circuit (for example, an integrated circuit including a transistor, a capacitor, an encoder, a resistor, a multiplexer, and the like, or an FPGA), or may be implemented in software within an integrated circuit.

In an embodiment, the power controller 160 may generate the voltage control signal INF based on the current state signal ALERT provided from the power supply 150. The current state signal ALERT may indicate whether the overcurrent occurs. For example, the current state signal ALERT may be generated in a current sensing block by comparing the total current I_VDD with at least one reference current value. When the current sensing block is embedded in the power supply 150, the current state signal ALERT may be provided from the power supply 150 to the power controller 160.

A detailed configuration and operation of the power controller 160 will be described later with reference to FIGS. 5 and 6.

As described above, the display device 100 may mitigate the occurrence of overcurrent by changing the voltage level of the third power voltage VINT as the total current I_VDD applied to the display unit 110 increases.

Meanwhile, in FIG. 1A, although the power controller 160 is shown to be implemented independently from the power supply 150 and the timing controller 140, embodiments of the inventive concept are not limited thereto. For example, referring to FIGS. 1A and 1B, at least a part of the power controller 160 may be included in the timing controller 140. In this case, the timing controller 140 may generate the voltage control signal INF based on the current state signal ALERT provided from the power supply 150.

Meanwhile, at least one of the scan driver 120, the data driver 130, the timing controller 140, the power supply 150, and the power controller 160 may be formed on the display unit 110 or implemented as an integrated circuit and connected to the display unit 110 in the form of a tape carrier package. In addition, at least two of the scan driver 120, the data driver 130, the timing controller 140, the power supply 150, and the power controller 160 may be implemented as one integrated circuit. For example, as shown in FIG. 1B, at least a part of the power controller 160 may be included in the timing controller 140. In this case, the timing controller 140 may generate the voltage control signal INF based on the current state signal ALERT provided from the power supply 150. As another example, the data driver 130 and the timing controller 140 may be implemented as one integrated circuit.

Figure 2:
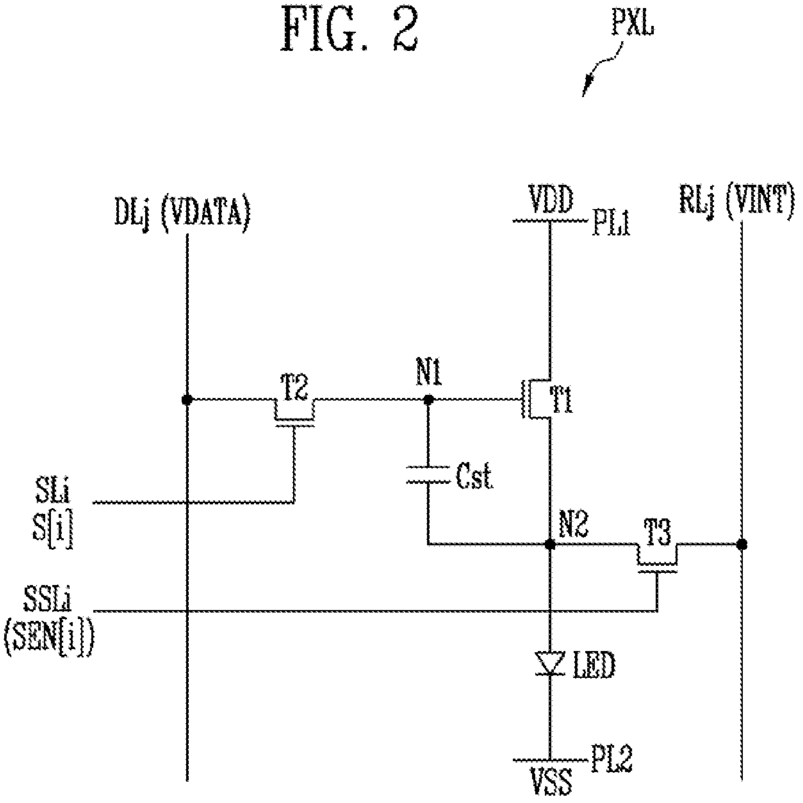
FIG. 2 is a circuit diagram of a pixel included in the display device of FIG. 1A.

FIG. 2 is a circuit diagram of a pixel included in the display device 100 of FIG. 1A. A pixel PXL positioned in the i-th row and the j-th column is shown as an example.

Referring to FIG. 2, the pixel PXL may be connected to the i-th scan line SLi, the j-th data line DLj, the i-th sensing scan line SSLi, and the j-th readout line RLj.

The pixel PXL may include a light emitting element LED, a first transistor T1 (or a driving transistor), a second transistor T2 (or a first switching transistor), a third transistor T3 (a sensing transistor, a second switching transistor, or an initialization transistor), and a storage capacitor Cst. Each of the first transistor T1, the second transistor T2, and the third transistor T3 may be a thin film transistor including an oxide semiconductor, but embodiments of the inventive concept are not limited thereto. For example, at least one of the first transistor T1, the second transistor T2, and the third transistor T3 may include a polysilicon semiconductor, or may be implemented as an N-type semiconductor or a P-type semiconductor.

A first electrode (or an anode electrode) of the light emitting element LED may be connected to a second node N2 (or a second electrode of the first transistor T1). The first electrode of the light emitting element LED may be connected to a first power line PL1 to which the first power voltage VDD is applied via the first transistor T1. A second electrode (or a cathode electrode) of the light emitting element LED may be connected to a second power line PL2 to which the second power voltage VSS is applied. The light emitting element LED may generate light of a predetermined luminance in response to the amount of current (or driving current) supplied from the first transistor T1. The light emitting element LED may be composed of an organic light emitting diode, or may be composed of an inorganic light emitting diode such as a micro LED (light emitting diode) or a quantum dot light emitting diode. In addition, the light emitting element may be a light emitting diode composed of a combination of an organic material and an inorganic material.

A first electrode (for example, a drain electrode) of the first transistor T1 may be connected to the first power line to which the first power voltage VDD is applied, and the second electrode (for example, a source electrode) may be connected to the second node N2 (or the anode electrode of the light emitting element LED). A gate electrode of the first transistor T1 may be connected to a first node N1. The first transistor T1 may control the amount of current flowing through the light emitting element LED in response to a voltage of the first node N1 (or a gate-source voltage applied between the second electrode and the gate electrode of the first transistor T1).

A first electrode of the second transistor T2 may be connected to the j-th data line DLj, and a second electrode may be connected to the first node N1. A gate electrode of the second transistor T2 may be connected to the i-th scan line SLi. When an i-th scan signal S[i] is supplied to the i-th scan line SLi, the second transistor T2 may be turned on to transfer a data signal VDATA (or a data voltage) received from the j-th data line DLj to the first node N1.

The storage capacitor Cst may be formed or connected between the first node N1 and the first electrode of the light emitting element LED. The storage capacitor Cst may store the voltage of the first node N1.

The third transistor T3 may be connected between the j-th readout line RLj and the second node N2 (or the second electrode of the first transistor T1). The third transistor T3 may connect the second node N2 and the j-th readout line RLj in response to a sensing scan signal SEN[i]. In this case, the third power voltage VINT applied to the j-th readout line RLj may be applied to the second node N2. A voltage of the second node N2 or one electrode of the light emitting element LED may be initialized by the third power voltage VINT.

When the second transistor T2 and the third transistor T3 are simultaneously turned on in response to the i-th scan signal S[i] and the i-th sensing scan signal SEN[i], a voltage difference between the data signal VDATA and the third power voltage VINT may be stored in the storage capacitor Cst, and the first transistor T1 may control the amount of current flowing through the light emitting element LED in response to the voltage difference stored in the storage capacitor Cst.

In contrast, when the third transistor T3 connects the second node N2 and the j-th readout line RLj in response to the i-th sensing scan signal SEN[i], a sensing signal may be provided from the pixel PXL to the j-th readout line RLj. For example, a sensing voltage (or the voltage of the second node N2) may be provided to the j-th readout line RLj. As another example, when the first transistor T1 is turned on by a test voltage (that is, a test voltage applied as the data signal VDATA), the current flowing through the first transistor T1 in response to the test voltage may be provided to the j-th readout line RLj as the sensing signal.

Meanwhile, in embodiments of the inventive concept, the pixel PXL is not limited to the circuit structure shown in FIG. 2.

Figure 3:
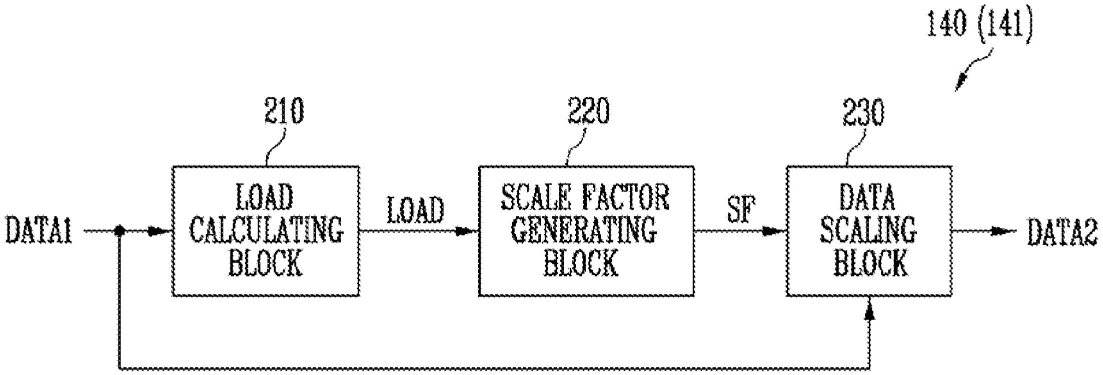
FIG. 3 is a diagram of a timing controller included in the display device of FIG. 1A.

FIG. 3 is a diagram of a timing controller included in the display device 100 of FIG. 1A. FIG. 3 schematically shows the timing controller 140 based on the current limiting function, or NPC (Net Power Control), of the timing controller 140. The current limiting function may be implemented with a power consumption adjustment block 141 configured with a logic circuit in the timing controller 140.

Figure 4A:
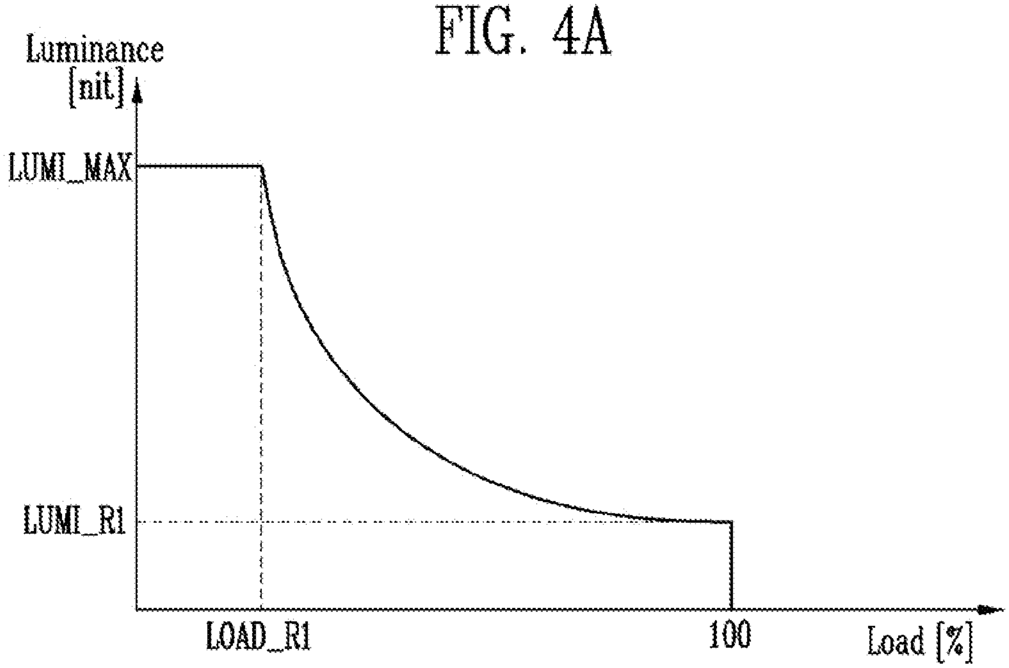
FIG. 4A is a graph of luminance according to a load of input image data.
Figure 4B:
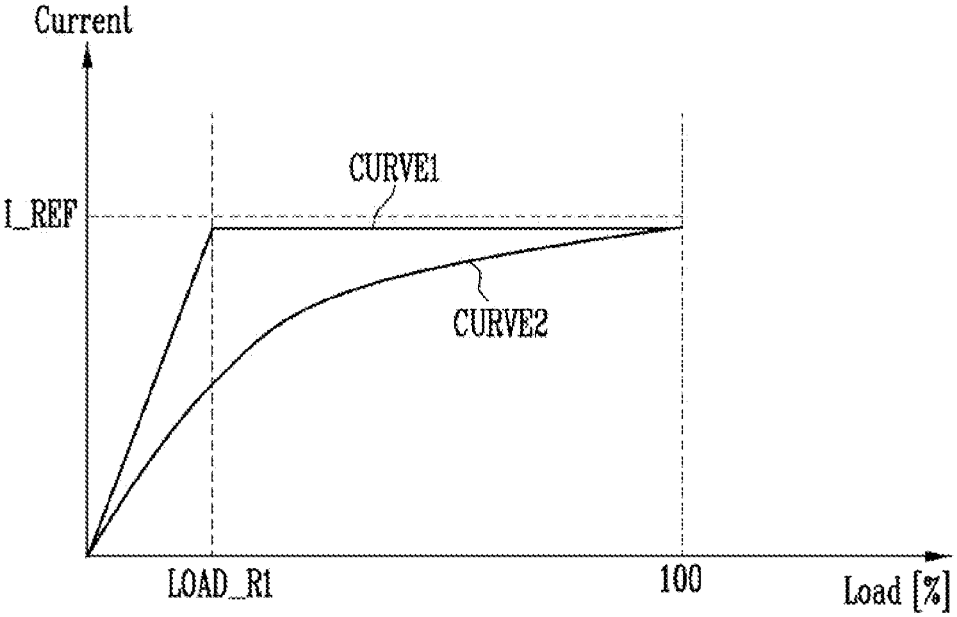
FIG. 4B is a graph of current according to the load of the input image data.

FIG. 4A is a graph of luminance according to a load of input image data. That is, FIG. 4A shows a luminance curve showing a change in luminance of the display unit 110 according to a load LOAD. FIG. 4B is a graph of current according to the load of the input image data. That is, FIG. 4B shows a current (for example, the total current I_VDD shown in FIG. 1A) supplied from the power supply 150 to the display unit 110 according to the load LOAD.

First, referring to FIGS. 1A, 1B and 3, the timing controller 140 may include a load calculating block 210, a scale factor generating block 220, and a data scaling block 230. Each of the load calculating block 210, the scale factor generating block 220, and the data scaling block 230 may be implemented as a combination of logic circuits (or logic operation elements), or may be implemented as software within the timing controller 140.

The load calculating block 210 may calculate or determine the load LOAD based on the input image data DATA1. The load LOAD may indicate a ratio of the pixel PXL (or pixels) that emit light in the display unit 110. When the display unit 110 emits light in full white (for example, when all pixels of the display unit 110 emit light with a luminance corresponding to white), the load LOAD may be set to 100%. The load calculating block 210 may calculate the load LOAD of the input image data DATA1 (or a load of the display unit 110 according to the input image data DATA1) in units of one frame. For example, the load calculating block 210 may calculate the load LOAD of one frame data (or one frame) by summing data values included in the one frame data of the input image data DATA1. As used herein, "one frame data", "one frame", and the like may include all image data provided to all pixel rows of the display panel during a given frame period.

The scale factor generating block 220 may generate a scaling factor SF in which the data values (for example, the first data value corresponding to the pixel PXL) in the input image data DATA1 can be adjusted based on the load LOAD.

In an embodiment, the scale factor generating block 220 may generate the scaling factor SF based on Equation 1 below.

$$SF = NPC\_limit \times (1/LOAD)^{P} \quad \text{[Equation 1]}$$

Here, NPC_limit is a maximum load (for example, a reference load LOAD_R1, see FIG. 4A) that may emit light with a maximum luminance LUMI_MAX (see FIG. 4A), and may be set to a value greater than 0 and less than or equal to 1. P may be a control value (or data) for controlling a falling slope from the maximum luminance to a luminance (for example, a first reference luminance LUMI_R1, see FIG. 4A) at which the display device 100 emits light in full white. Meanwhile, the scaling factor SF may be calculated to be greater than or less than 1. For example, when the scaling factor SF is calculated to be greater than 1 by Equation 1, the scale factor generating block 220 may change the scaling factor SF to 1.

The data scaling block 230 may convert the input image data DATA1 into the image data DATA2 using the scaling factor SF. For example, the data scaling block 230 may generate the image data DATA2 (for example, the second data value included in the image data DATA2 and corresponding to the pixel PXL) by multiplying the data values included in the input image data DATA1 (for example, the first data value corresponding to the pixel PXL) by the scaling factor SF.

As the load LOAD increases, a data value of the image data DATA2 may be reduced, the size of the data signal generated by the data driver 130 may be reduced, the amount of current flowing through the pixel PXL may decrease, and the current applied to the display unit 110 (current consumption, or power consumption) may decrease.

Referring to FIG. 4B, each of a first curve CURVE1 and a second curve CURVE2 may represent the current according to the load LOAD (that is, the current applied to the display unit 110). For example, the first curve CURVE1 may correspond to a case where the control value P is 1 in Equation 1, and the second curve CURVE2 may correspond to a case where the control value P is greater than 1. According to the control value P of Equation 1, a current curve may be variously changed, as shown by the first curve CURVE1 and the second curve CURVE2.

Referring to the first curve CURVE1, when the load LOAD is less than or equal to the reference load LOAD_R1, the current (or the amount of current) may be changed within a range equal to or less than a reference current I_REF (or a reference current value) in proportion to the load LOAD. When the load LOAD is larger than the reference load LOAD_R1, the current may be kept substantially constant regardless of the load LOAD. Since the scaling factor SF is set to be inversely proportional to the load LOAD according to Equation 1, the load of the image data DATA2 reflecting the scaling factor SF (for example, a value obtained by multiplying the scaling factor SF by the load LOAD of the input image data DATA1) may be kept constant. Accordingly, the current may be substantially maintained at a constant value similar to the reference current I_REF.

As described above, the current (for example, the total current I_VDD) flowing through the display unit 110 may be stably limited to equal to or less than the reference current I_REF according to the operation of the timing controller 140 (or the power consumption adjustment block 141). However, as the timing controller 140 may calculate the load LOAD of the input image data DATA1 in units of one frame, a delay of at least one frame may occur in the current limiting.

Figure 4C:
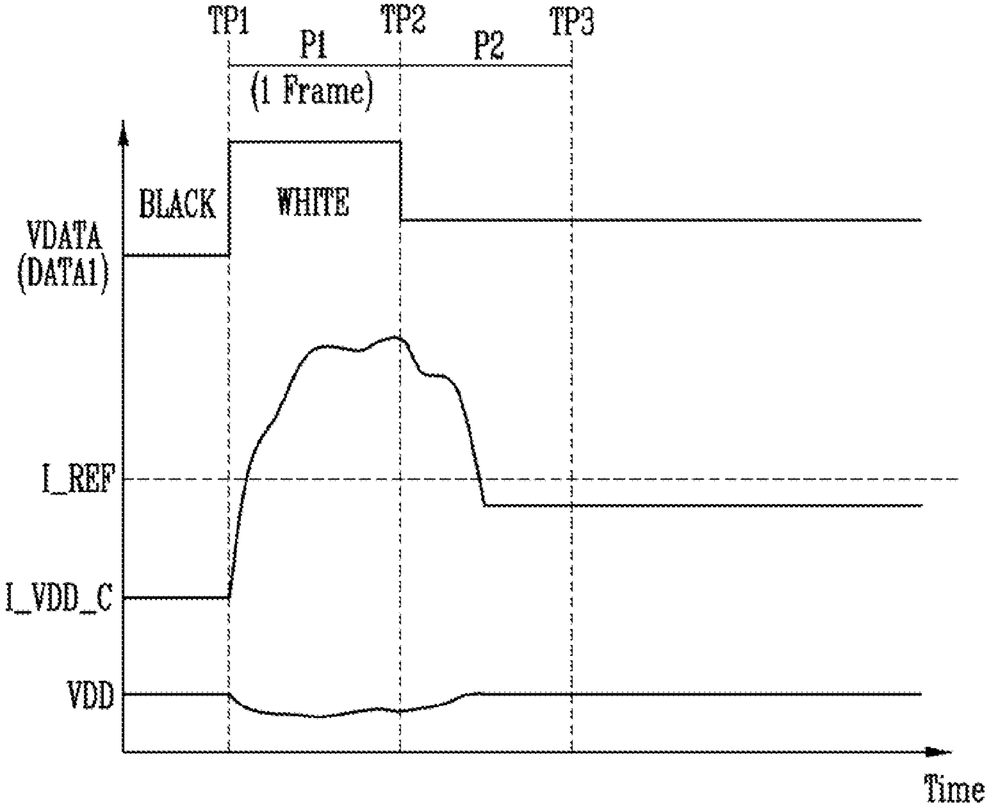
FIG. 4C is a diagram illustrating a comparative example of a data signal and a current according to a change in input image data.

FIG. 4C is a diagram illustrating a comparative example of a data signal and a current according to a change in input image data. FIG. 4C shows the data signal VDATA (or first image data DATA1), a comparative example total current I_VDD_C, and the first power voltage VDD.

A display device may limit current flowing through a display panel in response to a load of data in order to minimize power consumption. The display device may control a bit of data such that the amount of current is limited in response to a load of the input image data.

However, when it takes time to calculate the load of the input image data and control the bit of data, it may be difficult to immediately limit the current flowing through the display panel. During a time when current limit is not applied, overcurrent may flow through the display panel and power consumption may be increased. In contrast to this comparative example, embodiments of the inventive concept may reduce power consumption by mitigating occurrence of overcurrent.

Referring to FIGS. 1A, 1B, 3, and 4C, at a first time point TP1, the input image data DATA1 may be changed from full black data BLACK to full white data WHITE. Here, the full black data BLACK may include only minimum grayscale values so that the entire display unit 110 displays a black image, and the full white data WHITE may include only maximum grayscale values so that the entire display unit 110 displays a white image. That is, at the first time point TP1, an actual load of the frame data of the input image data DATA1 may become greater than an actual load of a previous frame data.

The load calculating block 210 may calculate the load LOAD based on the input image data DATA1 in a first section P1 (or a first frame section) between the first time point TP1 and a second time point TP2. When the load LOAD is calculated by summing all the data values in the input image data DATA1, it may take a predetermined time (for example, one frame) to calculate the load LOAD, and the calculated load LOAD may be applied not to the first section P1 but to a second section P2 after the second time point TP2. That is, the load LOAD of the input image data DATA1 at the current time point may be applied one frame (or a time corresponding thereto) later.

Meanwhile, the data scaling block 230 may generate second image data DATA2 by using a previous load (that is, a load LOAD of the full black data BLACK) calculated in a previous frame in the first section P1. Since the previous load is lower than the reference load LOAD_R1 (see FIG. 4A) according to black image data BLACK, in the first section P1, the input image data DATA1 may not be downscaled, and the second data value of the image data DATA2 may be the same as the first data value of the input image data DATA1.

Accordingly, the data signal VDATA provided to the pixel PXL in the first section P1 may have a voltage level corresponding to an unadjusted data value, and the comparative example total current I_VDD_C in the first section P1 may exceed the reference current I_REF. That is, the comparative example total current I_VDD_C may not be limited in the first section P1, and overcurrent may occur. This overcurrent may cause an additional voltage drop of the first power voltage VDD, and may deteriorate display quality. In addition, this overcurrent may flow into the data driver 130 through the first power line PL1, the third transistor T3, and the j-th readout line RLj shown in FIG. 2, and may cause damage to the data driver 130.

Meanwhile, the data scaling block 230 may generate the second image data DATA2 by using a load of the full white data WHITE in a second section P2 (or a second frame section). Accordingly, in the second section P2, the input image data DATA1 may be downscaled, the data signal VDATA may have a voltage level adjusted lower than the voltage level in the first section P1, and the comparative example total current I_VDD_C may be limited and lowered below the reference current I_REF.

As described above, the current limiting function of the timing controller 140 (or the power consumption adjustment block 141) may be delayed by one frame (or a time corresponding thereto) and performed. In addition, overcurrent may flow into the display unit 110 during a dead-zone section of the current limiting function (that is, the first section P1 between the first time point TP1 in which the current limiting function is to be applied and the second time point TP2 in which the current limiting function is actually applied), and this may cause damage to the data driver 130.

Accordingly, and in contrast to this comparative example, the display device 100 according to embodiments of the inventive concept may change the voltage level of the third power voltage VINT based on the total current I_VDD using the power controller 160. Through this, the occurrence of overcurrent in the dead-zone section (for example, the first section P1 of FIG. 4C) of the current limiting function may be mitigated.

Figure 5:
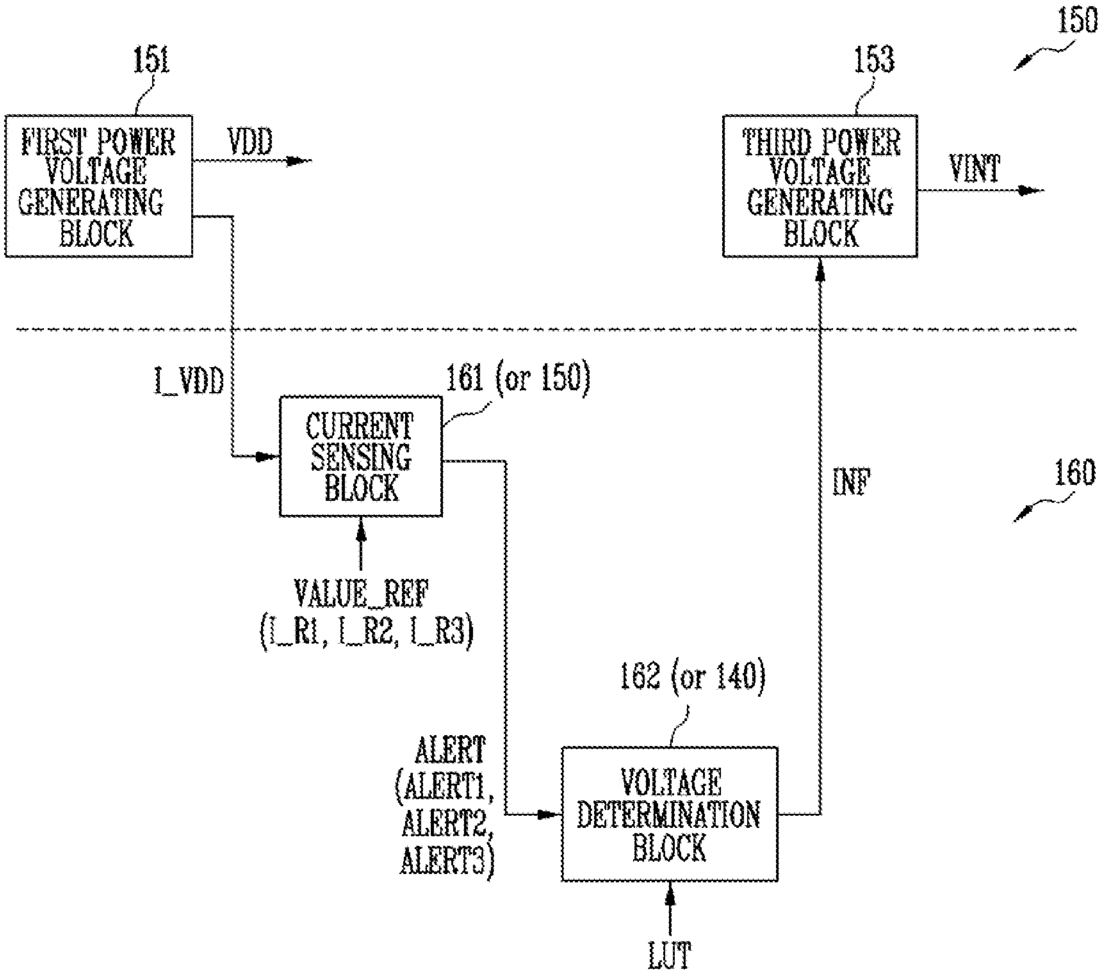
FIG. 5 is a diagram of a power supply and a power controller included in the display device of FIG. 1A.

FIG. 5 is a diagram of a power supply and a power controller included in the display device 100 of FIG. 1A. FIG. 5 schematically shows the configuration of the power supply 150 and the power controller 160 in connection with the change of the third power voltage VINT. FIG. 6 is a diagram for explaining an operation of the power controller of FIG. 5 according to an embodiment. FIG. 6 shows the voltage level of the third power voltage VINT according to the total current I_VDD.

Referring to FIGS. 1A, 1B, and 5, the power supply 150 may include a first power voltage generating block 151 and a third power voltage generating block 153. Each of the first power voltage generating block 151 and the third power voltage generating block 153 may be implemented as a power converter such as a boost converter or a buck converter. The power supply 150 may further include a second power voltage generating block for generating the second power voltage VSS (see FIG. 1A), and the second power voltage generating block may be the same as or similar to the first power voltage generating block 151 and the third power voltage generating block 153. The power controller 160 may include a current sensing block 161 and a voltage determination block 162. Each of the current sensing block 161 and the voltage determination block 162 may be implemented as a combination of logic operation elements (or logic elements) or may be implemented as software in the timing controller 140. In addition, as described with reference to FIG. 1B, the current sensing block 161 may be included in the power supply 150, or the voltage determination block 162 may be included in the timing controller 140.

Hereinafter, according to a sequential process of changing the voltage level of the third power voltage VINT, the first power voltage generating block 151, the current sensing block 161, the voltage determination block 162, and the third power voltage generating block 153 will be sequentially described.

The first power voltage generating block 151 may generate the first power voltage VDD. For example, the first power voltage generating block 151 may generate a first power voltage VDD, based on an external power, suitable for driving the display unit 110. For example, the first power voltage generating block 151 may generate a first power voltage VDD having a constant voltage level, but embodiments of the inventive concept are not limited thereto. The first power voltage VDD may be provided from the first power voltage generating block 151 to the display unit 110.

In some embodiments, the first power voltage generating block 151 may sense the total current I_VDD using the current sensor at the output terminal from which the first power voltage VDD is output, and output the total current I_VDD (or the sensing signal corresponding to the total current I_VDD). Meanwhile, an embodiment in which the first power voltage generating block 151 senses and outputs the total current I_VDD has been described, but embodiments of the inventive concept are not limited thereto. For example, the current sensing block 161 may sense the total current I_VDD.

The current sensing block 161 may generate the current state signal ALERT by comparing the total current I_VDD with at least one reference current value VALUE_REF. At least one reference current value VALUE_REF may be preset and stored in a separate memory device or the like. The current state signal ALERT may indicate whether an overcurrent occurs.

In some embodiments, the at least one reference current value VALUE_REF may include a first reference current value I_R1, a second reference current value I_R2, and a third reference current value I_R3. The second reference current value I_R2 may be greater than the first reference current value I_R1, and the third reference current value I_R3 may be greater than the second reference current value I_R2. One of the first reference current value I_R1, the second reference current value I_R2, and the third reference current value I_R3 may be the same as or similar to a value of the reference current I_REF (see FIG. 4B). For example, the first reference current value I_R1 may be the same as or similar to the value of the reference current I_REF. However, embodiments of the inventive concept are not limited thereto, and the first reference current value I_R1, the second reference current value I_R2, and the third reference current value I_R3 may be variously set within a range that may achieve the purpose of mitigating overcurrent based on the first reference current value I_R1.

Figure 6:
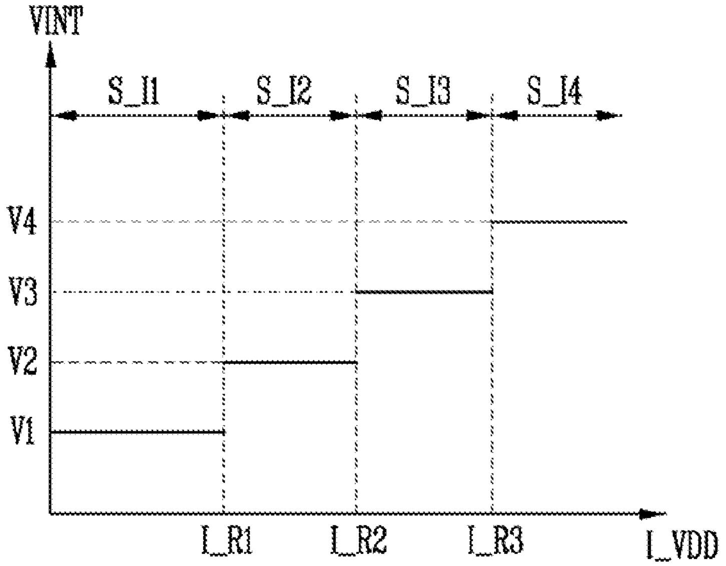
FIG. 6 is a diagram for explaining an operation of the power controller of FIG. 5 according to an embodiment.

Referring to FIG. 6, in an embodiment, the current sensing block 161 may compare the total current I_VDD with the first reference current value I_R1, output the current state signal ALERT having a first value (or a first state signal ALERT1 having a first logic level LOW) when the total current I_VDD belongs to or corresponds to a first section S_I1 (or a first current section) less than or equal to the first reference current value I_R1, and output the current state signal ALERT having a second value (or a first current state signal ALERT1 having a second logic level HIGH) when the total current I_VDD belongs to a second section S_I2 (or a second current section) equal to or greater than the first reference current value I_R1.

Similarly, the current sensing block 161 may further compare the total current I_VDD with the second reference current value I_R2, output the current state signal ALERT having the second value (or a second state signal ALERT2 having the first logic level LOW) when the total current I_VDD belongs to the second section S_I2 less than or equal to the second reference current value I_R2, and output the current state signal ALERT having a third value (or the second state signal ALERT2 having the second logic level HIGH) when the total current I_VDD belongs to a third section S_I3 (or a third current section) equal to or greater than the second reference current value I_R2.

Similarly, the current sensing block 161 may further compare the total current I_VDD with the third reference current value I_R3, output the current state signal ALERT having the third value (or a third current state signal ALERT3 having the first logic level LOW) when the total current I_VDD belongs to the third section S_I3 less than or equal to the third reference current value I_R3, and output the current state signal ALERT having a fourth value (or a third state signal ALERT3 having the second logic level HIGH) when the total current I_VDD belongs to a fourth section S_I4 (or a fourth current section) equal to or greater than the third reference current value I_R3.

The first, second, and third state signals ALERT1, ALERT2, and ALERT3 (or the first, second, and third current state signals) may be included in the current state signal ALERT, and may be provided to corresponding input terminals (or pins) of the voltage determination block 162, respectively. However, embodiments of the inventive concept are not limited thereto. For example, the current state signal ALERT may be a 3-bit signal corresponding to the first, second, and third state signals ALERT1, ALERT2, and ALERT3.

That is, the current sensing block 161 may determine a section to which the total current I_VDD belongs among the sections S_I1, S_I2, S_I3, and S_I4 set based on the first reference current value I_R1, the second reference current value I_R2, and the third reference current value I_R3, and may output the current state signal ALERT having a value corresponding to a corresponding section.

The voltage determination block 162 may generate the voltage control signal INF based on the current state signal ALERT and a look-up table LUT. The look-up table LUT may include information relating to the voltage level of the third power voltage VINT according to the current state signal ALERT, and may be preset and stored in the memory device.

TABLE 1

| ALERT1 | ALERT2 | ALERT3 | VINT |
|---|---|---|---|
| LOW | LOW | LOW | 2.0 V |
| HIGH | LOW | LOW | 4.0 V |
| HIGH | HIGH | LOW | 6.0 V |
| HIGH | HIGH | HIGH | 8.0 V |

Table 1 shows an example of the look-up table LUT. As shown in Table 1, the voltage level of the third power voltage VINT according to the current state signal ALERT (that is, the first, second, and third state signals ALERT1, ALERT2, and ALERT3) may be set in advance. The values of the current state signal ALERT and the voltage level of the third power voltage VINT are shown as an example, and the values of the current state signal ALERT and the voltage level of the third power voltage VINT are not limited to the values shown in Table 1.

For example, when the current state signal ALERT has the first value (that is, when all of the first, second, and third state signals ALERT1, ALERT2, and ALERT3 have the first logic level LOW), the voltage determination block 162 may output the voltage control signal INF corresponding to 2.0V. As another example, when the current state signal ALERT has the second value (that is, when only the first state signal ALERT1 has the first logic level LOW), the voltage determination block 162 may output the voltage control signal INF corresponding to 4.0V. In this way, the voltage determination block 162 may output the voltage control signal INF corresponding to a value of the current state signal ALERT (for example, the voltage control signal INF corresponding to one of 2.0V, 4.0V, 6.0V, and 8.0V).

The third power voltage generating block 153 may generate the third power voltage VINT. For example, the first power voltage generating block 151 may generate the third power voltage VINT based on the external power. The third power voltage VINT may be provided from the third power voltage generating block 153 to the display unit 110.

In some embodiments, the third power voltage generating block 153 may change the voltage level of the third power voltage VINT in response to the voltage control signal INF. The voltage control signal INF may be provided from the voltage determination block 162 to the third power voltage generating block 153 through an inter-integrated circuit (I2C) interface.

For example, as described with reference to Table 1, the third power voltage generating block 153 may change the voltage level of the third power voltage VINT to one of 2.0V, 4.0V, 6.0V and 8.0V according to the voltage control signal (or a value of the voltage control signal).

Referring to FIG. 6, the power supply 150 may output the third power voltage VINT having a first voltage level V1 (for example, 2.0V) when the total current I_VDD is within the first section S_I1, output the third power voltage VINT having a second voltage level V2 (for example, 4.0V) when the total current I_VDD is within the second section S_I2, output the third power voltage VINT having a third voltage level V3 (for example, 6.0V) when the total current I_VDD is within the third section S_I3, and output the third power voltage VINT having a fourth voltage level V4 (for example, 8.0V) when the total current I_VDD is within the fourth section S_I4. That is, the power supply 150 may gradually change the third power voltage VINT based on the total current I_VDD.

As described with reference to FIG. 2, the first transistor T1 may provide the amount of current corresponding to the voltage difference between the data signal VDATA and the third power voltage VINT to the light emitting element LED. As the voltage level of the third power voltage VINT increases, the voltage difference between the data signal VDATA and the third power voltage VINT may be decreased, and the amount of current may also be decreased. That is, in the first section P1 (or the first frame section) described with reference to FIG. 4C, as the voltage level of the third power voltage VINT increases according to the total current I_VDD, an increase in the total current I_VDD (that is, the occurrence of overcurrent) may be mitigated.

As described above, the power controller 160 may generate the voltage control signal INF based on the total current I_VDD (or the current state signal ALERT indicating whether the overcurrent occurs), and the power supply 150 may change the voltage level of the third power voltage VINT in response to the voltage control signal INF. In particular, as in the first section P1 of FIG. 4C, when a situation in which the total current I_VDD exceeds the reference current I_REF occurs, the power controller 160 may increase the voltage level of the third power voltage VINT to mitigate the increase in the total current I_VDD. Accordingly, in the first section P1 of FIG. 4C (that is, the dead-zone section of the current limiting function), the occurrence of overcurrent may be mitigated.

Meanwhile, an embodiment in which the current sensing block 161 uses the first reference current value I_R1, the second reference current value I_R2, and the third reference current value I_R3 has been described as an example, but embodiments of the inventive concept are not limited thereto. For example, the current sensing block 161 may use only one reference current value (for example, the first reference current value I_R1), use two reference current values (for example, the first reference current value I_R1 and the second reference current value I_R2), or use four or more reference current values.

In addition, in FIGS. 5 and 6, an embodiment in which the power supply 150 (or the third power voltage generating block 153) gradually changes the voltage level of the third power voltage VINT has been described as an example, but embodiments of the inventive concept are not limited thereto. For example, the power supply 150 may linearly change the voltage level of the third power voltage VINT in at least one section.

Figure 7:
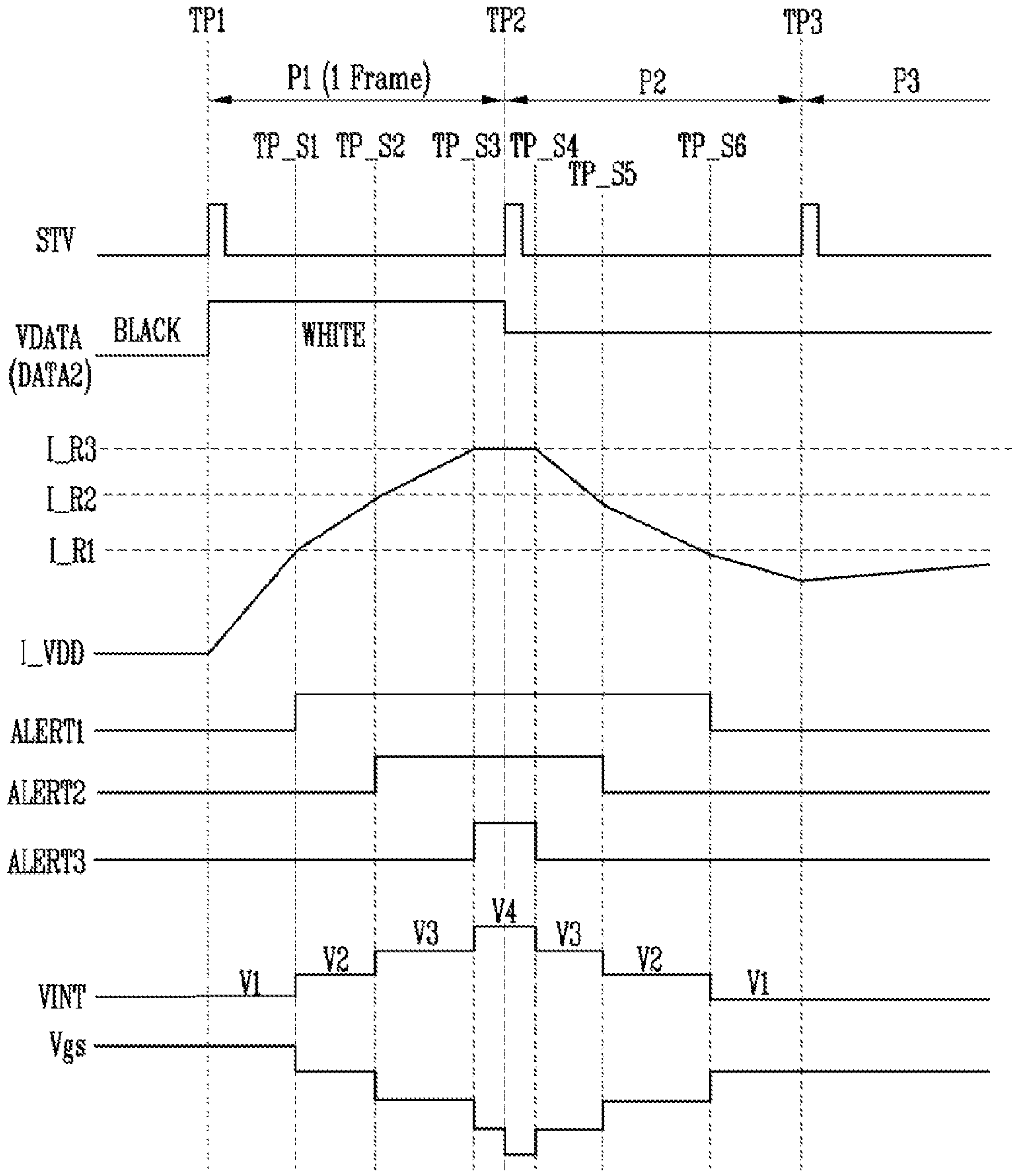
FIG. 7 is a diagram illustrating signals measured in the display device of FIG. 1A.
Figure 8:
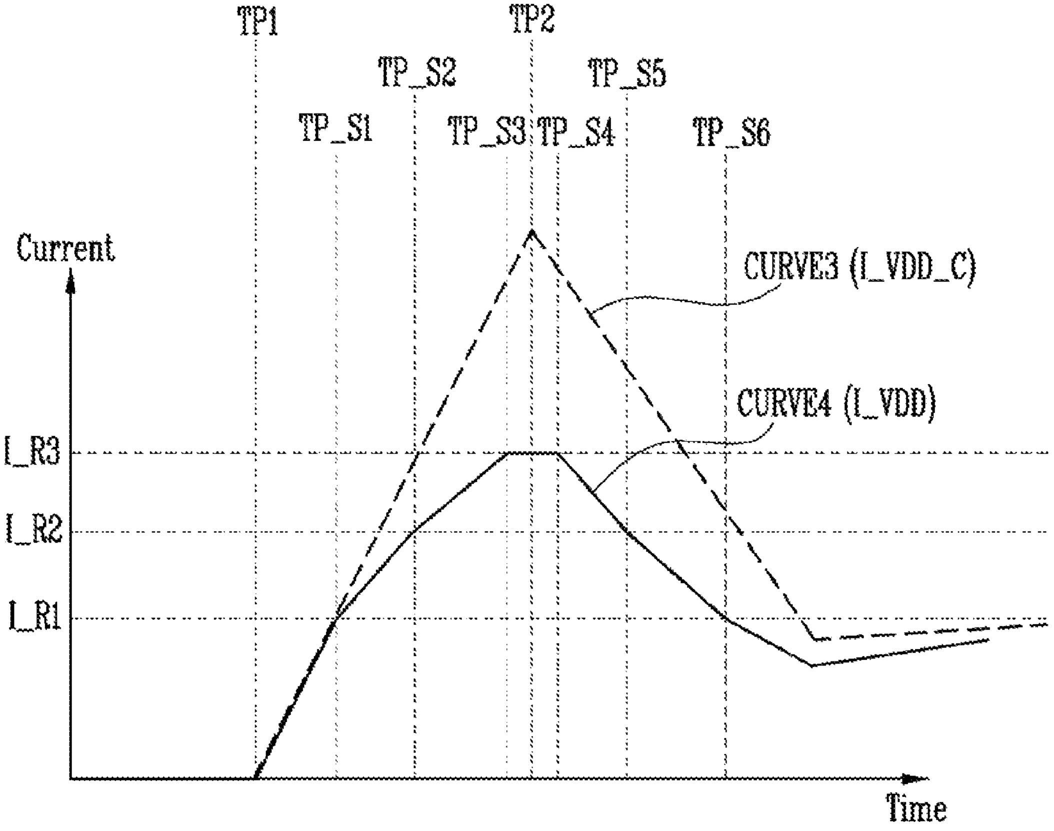
FIG. 8 is a diagram illustrating a change in current according to a change in input image data.

FIG. 7 is a diagram illustrating signals measured in the display device of FIG. 1A. FIG. 7 shows a start signal STV, the data signal VDATA, the total current I_VDD, the first, second, and third state signals ALERT1, ALERT2, and ALERT3, the third power voltage VINT, and a gate-source voltage Vgs (that is, the voltage applied between the gate electrode and the source electrode of the first transistor T1, see FIG. 2). FIG. 8 is a diagram illustrating a change in current according to a change in input image data. FIG. 8 shows a third curve CURVE3 representing the comparative example total current I_VDD_C in which the function of changing the third power voltage VINT is not provided, and a fourth curve CURVE4 representing the total current I_VDD according to an embodiment of the inventive concept.

Referring to FIGS. 1A, 1B, 2, 3, 4C, 5, 6, 7, and 8, the start signal STV may indicate the start of one frame, and may correspond to the start signal provided to the scan driver 120 (see FIG. 1A) or the vertical synchronization signal provided to the data driver 130. Frames may be divided based on a time point at which the start signal STV has a second logic level (or a logic high level).

As described with reference to FIG. 4C, at the first time point TP1, the input image data DATA1 may be changed from the full black data BLACK to the full white data WHITE. In addition, the load of the full white data WHITE calculated by the load calculating block 210 (see FIG. 3) may be applied to sections after the second time point TP2 (for example, the second section P2, a third section P3, etc.). Accordingly, the data signal VDATA provided to the pixel PXL may have a voltage level corresponding to the unadjusted data value (that is, white) in the first section P1, and may have a voltage level corresponding to an adjusted data value in the second section P2 and the third section P3 (that is, a voltage level lower than the voltage level in the first section P1). For example, the first power voltage VDD corresponding to the total current I_VDD may have the same voltage level in the first section P1 and the second section P2, but embodiments of the inventive concept are not limited thereto.

Since the data signal VDATA has an unadjusted voltage level in the first section P1, the total current I_VDD may increase in the first section P1. As will be described later with reference to FIG. 9A, as the display device 100 may use a sequential driving method (or as the display unit 110 may be sequentially driven), the total current I_VDD may gradually increase.

At a first sub-time point TP_S1, when the value of the total current I_VDD becomes equal to or greater than the first reference current value I_R1, the first state signal ALERT1 may be changed from a first logic level (for example, logic low) to a second logic level (for example, logic high). In response to the first state signal ALERT1 of the second logic level, the voltage level of the third power voltage VINT may be changed from the first voltage level V1 to the second voltage level V2. In this case, the gate-source voltage Vgs of the first transistor T1 of the pixel PXL corresponding to the first sub-time point TP_S1 (and a time point after the first sub-time point TP_S1) may be lowered. Accordingly, as shown in FIG. 8, after the first sub-time point TP_S1, the total current I_VDD may increase with a second slope that is gentle compared to a first slope of the comparative example total current I_VDD_C.

For reference, since the first transistor T1 of each of the pixels in the display unit 110 controls the amount of current based on the same data signal VDATA, when only the data signal VDATA and the third power voltage VINT are considered, the comparative example total current I_VDD_C may increase with a constant first slope during the first section P1.

Thereafter, at a second sub-time point TP_S2, when the value of the total current I_VDD becomes equal to or greater than the second reference current value I_R2, the second state signal ALERT2 may be changed from the first logic level to the second logic level. In response to the second state signal ALERT2 of the second logic level, the voltage level of the third power voltage VINT may be changed from the second voltage level V2 to the third voltage level V3. In this case, the gate-source voltage Vgs of the first transistor T1 of the pixel PXL corresponding to the second sub-time point TP_S2 (and a time point after the second sub-time point TP_S2) may be lowered. Therefore, as shown in FIG. 8, after the second sub-time point TP_S2, the total current I_VDD may increase with a third slope that is gentle compared to the first slope of the comparative example total current I_VDD_C (and the second slope of the total current I_VDD in a section between the first sub-time point TP_S1 and the second sub-time point TP_S2).

At a third sub-time point TP_S3, when the value of the total current I_VDD becomes equal to or greater than the third reference current value I_R3, the third state signal ALERT3 may be changed from the first logic level to the second logic level. In response to the third state signal ALERT3 of the second logic level, the voltage level of the third power voltage VINT may be changed from the third voltage level V3 to the fourth voltage level V4. In this case, the gate-source voltage Vgs of the first transistor T1 of the pixel PXL corresponding to the third sub-time point TP_S3 (and a time point after the third sub-time point TP_S3) may be lowered. Therefore, as shown in FIG. 8, after the third sub-time point TP_S3, the total current I_VDD may increase with a fourth slope that is gentle compared to the first slope of the comparative example total current I_VDD_C (and the third slope of the total current I_VDD in a section between the second sub-time point TP_S2 and the third sub-time point TP_S3). According to an embodiment, when the fourth voltage level V4 of the third power voltage VINT is set to be the same as or similar to the voltage level of the data signal VDATA in the first section P1, the current may not flow through the first transistor T1, and the total current I_VDD may not increase after the third sub-time point TP_S3.

As shown in FIG. 8, in the whole of the first section P1, the total current I_VDD according to an embodiment of the inventive concept may increase more gradually than the comparative example total current I_VDD_C, and a peak value of the total current I_VDD in the first section P1 may be lower than a peak value of the comparative example total current I_VDD_C. Accordingly, the occurrence of overcurrent in the first section P1 may be mitigated. In particular, when the first, second, and third reference current values I_R1, I_R2, and I_R3 and the second, third, and fourth voltage levels V2, V3, and V4 of the third power voltage VINT are optimally set, the peak value of the total current I_VDD may be lower than the reference current I_REF (see FIG. 4B).

Thereafter, in the second section P2, since the data signal VDATA has an adjusted voltage level (that is, a voltage level lower than the voltage level in the first section P1), the gate-source voltage Vgs of the first transistor T1 of the PXL in the second section P2 may become lower than the gate-source voltage Vgs in the first section P1. Accordingly, the maximum luminance (and/or average luminance) of the display unit 110 in the second section P2 may become lower than the maximum luminance (and/or average luminance) of the display unit 110 in the first section P1, and the comparative example total current I_VDD_C and the total current I_VDD according to an embodiment may be decreased. For example, the comparative example total current I_VDD_C may be decreased with a constant fifth slope during the second section P2. When the fourth voltage level V4 of the third power voltage VINT is set to be the same as or similar to the voltage level of the data signal VDATA in the second section P2, the current may not flow through the first transistor T1, and the total current I_VDD may not decrease until a fourth sub-time point TP_S4.

The total current I_VDD at the fourth sub-time point TP_S4, a fifth sub-time point TP_S5, and the sixth sub-time point TP_S6 may be changed opposite to a change in the total current I_VDD at the first sub-time point TP_S1, the second sub-time point TP_S2, and the third sub-time point TP_S3.

At the fourth sub-time point TP_S4, when the value of the total current I_VDD becomes equal to or smaller than the third reference current value I_R3, the third state signal ALERT3 may be changed from the second logic level to the first logic level. In response to the third state signal ALERT3 of the first logic level, the voltage level of the third power voltage VINT may change from the fourth voltage level V4 to the third voltage level V3. In this case, the gate-source voltage Vgs of the first transistor T1 of the pixel PXL may be increased, and the total current I_VDD may be decreased with a slope corresponding to the gate-source voltage Vgs.

At the fifth sub-time point TP_S5, when the value of the total current I_VDD becomes equal to or smaller than the second reference current value I_R2, the second state signal ALERT2 may be changed from the second logic level to the first logic level. In response to the second state signal ALERT2 of the first logic level, the voltage level of the third power voltage VINT may be changed from the third voltage level V3 to the second voltage level V2, the gate-source voltage Vgs may be increased, and the total current I_VDD may be decreased more gently.

At the sixth sub-time point TP_S6, when the value of the total current I_VDD becomes equal to or smaller than the first reference current value I_R1, the first state signal ALERT1 may be changed from the second logic level to the first logic level. In response to the first state signal ALERT1 of the first logic level, the voltage level of the third power voltage VINT may be changed from the second voltage level V2 to the first voltage level V1, the gate-source voltage Vgs may be increased to a desired voltage level, and the total current I_VDD may be decreased more gently.

In the third section P3, the data signal VDATA may have the adjusted voltage level as in the second section P2, and the voltage level of the third power voltage VINT may be maintained at the first voltage level V1. The total current I_VDD in the third section P3 may be increased by the amount of current that is relatively further reduced by the voltage level of the third power voltage VINT (that is, voltage levels higher than the first voltage level V1) in a section between the second time point TP2 and the sixth sub-time point TP_S6, and the total current I_VDD may be maintained at a certain level.

In FIGS. 7 and 8, an embodiment in which the total current I_VDD is changed based on the first, second, and third reference current values I_R1, I_R2, and I_R3 has been described, but the change in the total current I_VDD is not limited thereto. For example, as described with reference to FIGS. 5 and 6, the total current I_VDD may be changed with various slopes based on one, two, or three or more reference current values within a range in which the peak value is reduced compared to the comparative example total current I_VDD_C (that is, in a range in which overcurrent may be mitigated).

Figure 9A:
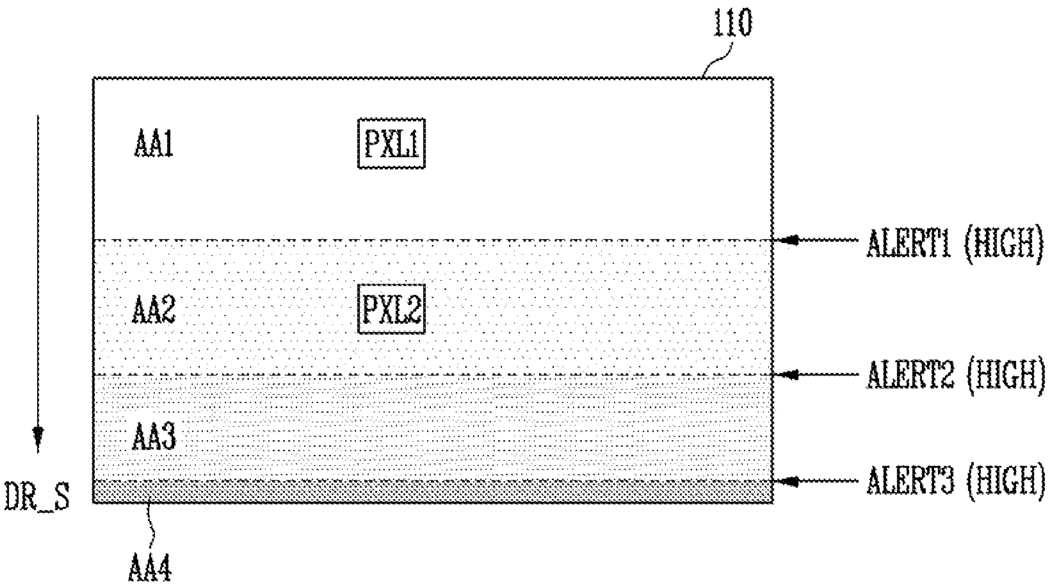
FIGS. 9A to 9C are diagrams for explaining an operation of the display device in first to third sections of FIG. 7.
Figure 9B:
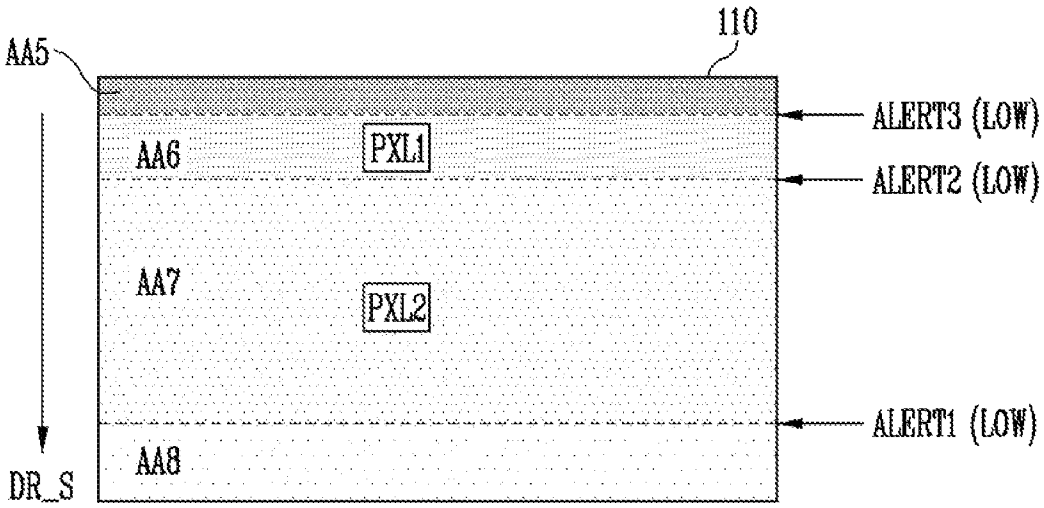
Figure 9C:
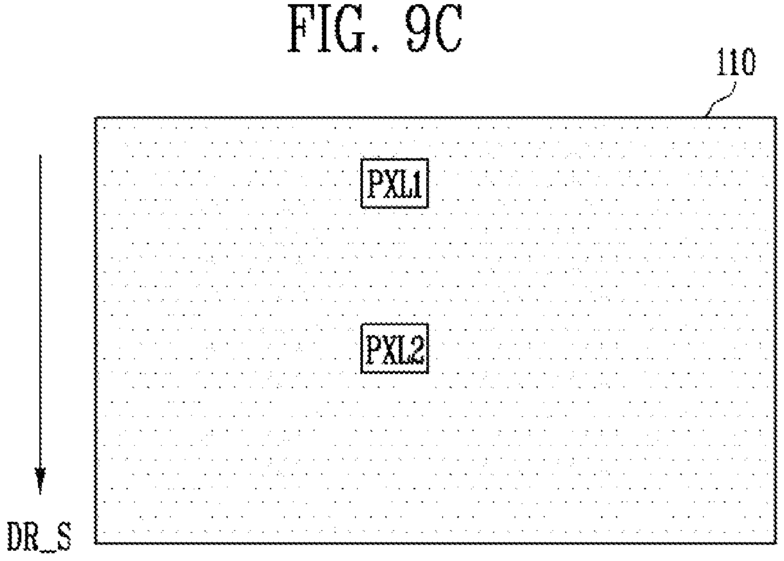

FIGS. 9A to 9C are diagrams for explaining an operation of the display device in first to third sections P1 to P3 of FIG. 7. FIG. 9A shows the display unit 110 displaying a first frame image corresponding to the first section P1 of FIG. 7, FIG. 9B shows a second frame image IMAGE_P2 corresponding to the second section P2 of FIG. 7, and FIG. 9C shows a third frame image IMAGE_P3 corresponding to the third section P3 of FIG. 7.

First, referring to FIGS. 1A, 1B, 7, and 9A, the display unit 110 may include the plurality of pixels. For example, the display unit 110 may include a first pixel PXL1 and a second pixel PXL2. Since the first pixel PXL1 and the second pixel PXL2 are substantially the same as or similar to the pixel PXL described with reference to FIGS. 1A and 2, duplicate descriptions will be omitted. For convenience of explanation, only the first pixel PXL1 and the second pixel PXL2 among the plurality of pixels provided on the display unit 110 are shown as an example.

The scan driver 120 may sequentially provide the scan signals to the display unit 110 along a scan direction DR_S. Accordingly, the pixels (for example, the first pixel PXL1 and the second pixel PXL2) may sequentially write the data signal VDATA along the scan direction DR_S and emit light with a luminance corresponding to the data signal VDATA (or the gate-source voltage Vgs).

The display unit 110 may be divided into first, second, third, and fourth areas AA1, AA2, AA3, and AA4 based on the first, second, and third sub-time points TP_S1, TP_S2, and TP_S3 shown in FIG. 7. At the first, second, and third sub-time points TP_S1, TP_S2, and TP_S3, the first, second, and third state signals ALERT1, ALERT2, and ALERT3 may be changed to have the first logic level and the second logic level HIGH, respectively.

For example, when the first pixel PXL1 is positioned in the first area AA1, the first pixel PXL1 may receive the data signal VDATA (see FIG. 7) and the third power voltage VINT of the first voltage level V1 in response to the scan signal provided from the scan driver 120 before the first sub-time point TP_S1, and may emit light with a luminance corresponding to the voltage difference between the data signal VDATA and the third power voltage VINT of the first voltage level V1. The first pixel PXL1 may emit light with a first luminance corresponding to white.

For example, when the second pixel PXL2 is positioned in the second area AA2, the second pixel PXL2 may receive the data signal VDATA and the third power voltage VINT of the second voltage level V2 in response to the scan signal provided from the scan driver 120 in a section between the first sub-time point TP_S1 and the second sub-time point TP_S2, and may emit light with a luminance corresponding to the voltage difference between the data signal VDATA and the third power voltage VINT of the second voltage level V2. Since the second voltage level V2 is greater than the first voltage level V1, the second pixel PXL2 may emit light with a second luminance lower than the first luminance.

Similarly, the pixel positioned in the third area AA3 may emit light with a third luminance (that is, a luminance lower than the second luminance) corresponding to the voltage difference between the data signal VDATA and the third power voltage VINT of the third voltage level V3. Also, the pixel positioned in the fourth area AA4 may emit a fourth luminance (that is, a luminance lower than the third luminance) corresponding to the voltage difference between the data signal VDATA and the third power voltage VINT of the fourth voltage level V4.

That is, during the first section P1 (or in the dead-zone section of the current limiting function), the pixels (for example, the first pixel PXL1 and the second pixel PXL2) in the display unit 110 may emit light with different luminances in response to the same data signal VDATA. As shown in FIG. 9A, the pixels may emit light with lower luminance along the scan direction DR_S.

Referring to FIGS. 1A, 1B, 7, 9A, and 9B, the display unit 110 may be divided into fifth, sixth, seventh, and eighth areas AA5, AA6, AA7, and AA8 based on the fourth, fifth, and sixth sub-time points TP_S4, TP_S5, and TP_S6 shown in FIG. 7. In the fourth, fifth, and sixth sub-time points TP_S4, TP_S5, and TP_S6, the first, second, and third state signals ALERT1, ALERT2, and ALERTS may be changed to have the second logic level HIGH and the first logic level LOW, respectively.

The pixel positioned in the fifth area AA5 may emit light with a luminance corresponding to the voltage difference between the data signal VDATA and the third power voltage VINT of the fourth voltage level V4. Since the data signal VDATA (see FIG. 7) in the second section P2 becomes smaller than the data signal VDATA in the first section P1, the pixel positioned in the fifth area AA5 may emit light with a fifth luminance lower than the fourth luminance of the pixel positioned in the fourth area AA4 of FIG. 9.

Similarly, the pixel (for example, the first pixel PXL1) positioned in the sixth area AA6 may emit light with a sixth luminance (that is, a luminance higher than the fifth luminance) corresponding to the voltage difference between the data signal VDATA and the third power voltage VINT of the third voltage level V3, the pixel (for example, the second pixel PXL2) positioned in the seventh area AA7 may emit light with a seventh luminance (that is, a luminance higher than the sixth luminance) corresponding to the voltage difference between the data signal VDATA and the third power voltage VINT of the voltage level V2, and the pixel positioned in the eighth area AA8 may emit light with an eighth luminance (that is, a luminance higher than the seventh luminance, for example, the first reference luminance LUMI_R1, see FIG. 4A) corresponding to the voltage difference between the data signal VDATA and the third power voltage VINT of the first voltage level V1.

That is, during the second section P2 (or in the frame section to which the current limiting function is normally applied), the pixels (for example, the first pixel PXL1 and the second pixel PXL2) in the display unit 110 may emit light with different luminances in response to the same data signal VDATA, but the pixels may emit light with higher luminance along the scan direction DR_S as shown in FIG. 9B.

Referring to FIGS. 1A, 1B, 7, 9B and 9C, the data signal VDATA may be maintained the same as in the second section P2, and the voltage level of the third power voltage VINT may be maintained at the first voltage level V1. Accordingly, all of the pixels of the display unit 110 may emit light with the eighth luminance.

Figure 10:
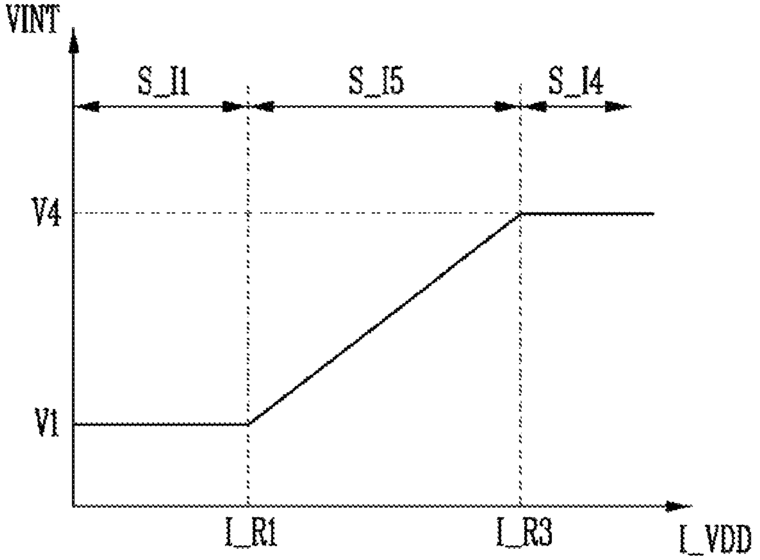
FIG. 10 is a diagram for explaining an operation of the power controller of FIG. 5 according to an embodiment.

FIG. 10 is a diagram for explaining an operation of the power controller 160 of FIG. 5 according to an embodiment.

Referring to FIGS. 5 and 10, the power controller 160 may generate the voltage control signal INF based on a difference between the total current I_VDD and the first reference current value I_R1. For example, the current sensing block 161 may include a comparator (or a differential amplifier) to generate the state signal ALERT corresponding to the difference between the total current I_VDD and the first reference current value I_R1, and the voltage determination block 162 may generate the voltage control signal INF corresponding to the state signal ALERT.

For example, when the total current I_VDD is within a fifth section S_I5 and is greater than the first reference current value I_R1 and less than the third reference current value I_R3, the voltage determination block 162 may output the voltage control signal INF corresponding to the difference between the total current I_VDD and the first reference current value I_R1. In addition, when the total current I_VDD is within the first section S_I1 and is smaller than the first reference current value I_R1, the voltage determination block 162 may generate the voltage control signal INF corresponding to the first voltage level V1. Similarly, when the total current I_VDD is within the fourth section S_I4 and is greater than the third reference current value I_R3, the voltage determination block 162 may generate the voltage control signal INF corresponding to the fourth voltage level V4.

As shown in FIG. 10, the power supply 150 may output the third power voltage VINT having the first voltage level V1 when the total current I_VDD is within the first section S_I1, output the third power voltage VINT having a voltage level proportional to the difference between the total current I_VDD and the first reference current value I_R1 when the total current I_VDD is within the fifth section S_I5, and output the third power voltage VINT having the fourth voltage level V4 when the total current I_VDD is within the fourth section S_I4. That is, the power supply 150 may linearly change the third power voltage VINT based on the total current I_VDD.

Meanwhile, in FIG. 10, the power supply 150 may change the voltage level of the third power voltage VINT with one slope in the fifth section S_I5, but embodiments of the inventive concept are not limited thereto. For example, as in the second section S_I2 and the third section S_I3 shown in FIG. 6, the power supply 150 may change the voltage level of the third power voltage VINT with different slopes in a plurality of sections.

The display device according to embodiments of the inventive concept may decrease the peak value of a total current by changing the voltage level of a third power voltage according to an increase in the total current applied to a display unit, and may thus mitigate the occurrence of overcurrent. In particular, the display device may mitigate the occurrence of overcurrent during a time when current limiting is not applied (that is, a dead-zone section of a current limiting function). Accordingly, power consumption of the display device may be reduced.

While the inventive concept has been particularly shown and described with reference to embodiments thereof, it will be understood by one of ordinary skill in the art that variations in form and detail may be made therein without departing from the spirit and scope of the inventive concept as defined by the following claims.

What is claimed is:

1. A display device comprising:
- a power supply generating a first power voltage, a second power voltage, and a third power voltage;
- a first power line to which the first power voltage is applied;
- a second power line to which the second power voltage is applied;
- a readout line to which the third power voltage is applied;
- a timing controller calculating a load of input image data, and generating image data by scaling a first data value in the input image data to a second data value based on the load;
- a data driver generating a data signal based on the second data value of the image data and providing the third power voltage provided from the power supply to the readout line;
- a display panel including a pixel, wherein the pixel includes a light emitting element connected between the first power line and the second power line, a switching transistor connected between one electrode of the light emitting element and the readout line, and a driving transistor controlling an amount of driving current flowing from the first power line through the light emitting element to the second power line based on a voltage difference between the data signal and the third power voltage,
- wherein the third power voltage initializes the pixel,
- wherein the power supply changes a voltage level of the third power voltage based on a comparison of a first reference current value and a total current flowing from the power supply through the first power line to the display panel according to the first and second power voltages, and
- wherein the first reference current value is preset.

2. The display device of claim 1, wherein the power supply changes the voltage level of the third power voltage in response to a value of the total current being greater than the first reference current value.

3. The display device of claim 2, wherein the power supply changes the voltage level of the third power voltage from a first voltage level to a second voltage level when the value of the total current is greater than the first reference current value.

4. The display device of claim 3, wherein the power supply gradually changes the voltage level of the third power voltage as the value of the total current increases.

5. The display device of claim 3, wherein the power supply:
- maintains the voltage level of the third power voltage at the second voltage level when the value of the total current is less than a second reference current value; and
- changes the voltage level of the third power voltage to a third voltage level when the value of the total current is greater than the second reference current value,
- wherein the second reference current value is greater than the first reference current value, and
- wherein the second reference current value is preset.

6. The display device of claim 2, wherein the power supply linearly changes the voltage level of the third power voltage based on a difference between the total current and the first reference current value.

7. The display device of claim 1, further comprising:
- a power controller generating a power control signal for the voltage level of the third power voltage by comparing the total current with at least one reference current value,
- wherein the power supply changes the voltage level of the third power voltage based on the power control signal.

8. The display device of claim 7, wherein the power supply includes:
- a first power voltage generating circuit outputting the first power voltage; and
- a third power voltage generating circuit generating the third power voltage based on the power control signal, and
- wherein the power controller includes:
- a current sensing circuit generating a current state signal by comparing the total current with the at least one reference current value; and
- a voltage determination circuit generating the power control signal based on the current state signal and a predetermined look-up table.

9. The display device of claim 8, wherein the at least one reference current value includes the first reference current value, a second reference current value, and a third reference current value, and
- wherein the current sensing circuit:
  - outputs the current state signal having a first value when the total current is within a first section smaller than the first reference current value;
  - outputs the current state signal having a second value when the total current is within a second section between the first reference current value and the second reference current value;
  - outputs the current state signal having a third value when the total current is within a third section between the second reference current value and the third reference current value; and
  - outputs the current state signal having a fourth value when the total current is within a fourth section exceeding the third reference current value.

10. The display device of claim 9, wherein the current state signal includes a first state signal, a second state signal, and a third state signal, each having a first logic level and a second logic level,
- wherein the first state signal changes from the first logic level to the second logic level when the total current becomes greater than the first reference current value,
- wherein the second state signal changes from the first logic level to the second logic level when the total current becomes greater than the second reference current value, and
- wherein the third state signal changes from the first logic level to the second logic level when the total current becomes greater than the third reference current value.

11. The display device of claim 1, wherein the timing controller determines a value of a scaling factor so that a value obtained by multiplying the load and the scaling factor does not exceed a reference load value, and downscales the input image data based on the scaling factor.

12. The display device of claim 1, wherein the timing controller:

calculates the load based on data values included in first frame data of the input image data in a first frame section; and generates second frame data of the image data by scaling second frame data of the input image data in a second frame section after the first frame section, and wherein the data driver generates the data signal based on first frame data of the image data in the first frame section, and generates the data signal based on the second frame data of the image data in the second frame section.

13. The display device of claim 12, wherein when a load of the first frame data of the input image data becomes greater than a load of previous frame data:

the total current becomes greater than the first reference current value in the first frame section; and the power supply changes the voltage level of the third power voltage from a first voltage level to a second voltage level in a partial section of the first frame section.

14. The display device of claim 13, wherein when a value of the total current becomes greater than a second reference current value in the first frame section, the power supply changes the voltage level of the third power voltage to a third voltage level.

15. The display device of claim 13, wherein when the total current becomes smaller than the first reference current value in the second frame section, the power supply changes the voltage level of the third power voltage from the second voltage level to the first voltage level in a partial section of the second frame section.

16. The display device of claim 15, wherein a maximum luminance of the display panel in the second frame section is lower than a maximum luminance of the display panel in the first frame section.

17. The display device of claim 12, further comprising:

a scan driver sequentially providing a first scan signal and a second scan signal to the display panel, wherein the display panel further includes:

a first pixel emitting light with a luminance corresponding to a voltage difference between a first data signal and the third power voltage in response to the first scan signal; and a second pixel emitting light with a luminance corresponding to a voltage difference between a second data signal and the third power voltage in response to the second scan signal, and wherein when the value of the total current becomes greater than the first reference current value in the first frame section, the first pixel and the second pixel emit light with different luminances in response to the first and second data signals having a same value.

18. The display device of claim 17, wherein the luminance of the second pixel is lower than the luminance of the first pixel in the first frame section.

19. The display device of claim 17, wherein when a value of the total current becomes smaller than the first reference current value in the second frame section, the first pixel and the second pixel emit light with different luminances in response to the same data value, but the luminance of the first pixel is lower than the luminance of the second pixel in the second frame section.

20. A display device comprising:

a power supply generating an initializing voltage and a supply voltage;

a display panel including a pixel;

a timing controller calculating a load of input image data, and generating image data by scaling a first data value in the input image data to a second data value based on the load; and a data driver generating a data signal based on the second data value of the image data and providing the initializing voltage provided from the power supply to the pixel;

wherein the power supply provides the supply voltage to the display panel through a power line, wherein the initializing voltage initializes the pixel, wherein an amount of driving current flowing through the pixel is varied based on a voltage difference between the data signal and the initializing voltage, wherein the power supply changes a voltage level of the initializing voltage based on a comparison of a first reference current value and a total current flowing from the power supply through the power line to the display panel according to the supply voltage, and wherein the first reference current value is preset.

21. The display device of claim 20, wherein the power supply changes the voltage level of the initializing voltage in response to a value of the total current being greater than the first reference current value.

22. The display device of claim 21, wherein the power supply linearly changes the voltage level of the initializing voltage based on a difference between the value of the total current and the first reference current value.

* * * * *